United States Patent
Alvarez et al.

(10) Patent No.: US 7,882,202 B2
(45) Date of Patent: Feb. 1, 2011

(54) SYSTEM TO DELEGATE VIRTUAL STORAGE ACCESS METHOD RELATED FILE OPERATIONS TO A STORAGE SERVER USING AN IN-BAND RPC MECHANISM

(75) Inventors: Guillermo Alejandro Alvarez, San Jose, CA (US); David Darden Chambliss, Morgan Hill, CA (US); Prashant Pandey, San Jose, CA (US); Vijayshankar Raman, Sunnyvale, CA (US); James Alan Ruddy, San Jose, CA (US); Garret Frederick Swart, Palo Alto, CA (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/060,501

(22) Filed: Apr. 1, 2008

(65) Prior Publication Data

US 2009/0248699 A1    Oct. 1, 2009

(51) Int. Cl.
*G06F 15/16* (2006.01)
(52) U.S. Cl. .................... 709/217; 709/203; 709/216; 709/218; 709/219
(58) Field of Classification Search ............... 709/203, 709/217, 216, 218, 219
See application file for complete search history.

(56) References Cited

U.S. PATENT DOCUMENTS

| | | | |
|---|---|---|---|
| 5,568,628 A * | 10/1996 | Satoh et al. ................. | 711/113 |
| 5,802,367 A * | 9/1998 | Held et al. .................. | 719/332 |
| 5,838,910 A | 11/1998 | Domenikos et al. | |
| 5,857,191 A | 1/1999 | Blackwell, Jr. et al. | |
| 6,148,402 A * | 11/2000 | Campbell ..................... | 726/10 |
| 6,532,542 B1 | 3/2003 | Thomlinson et al. | |
| 6,952,724 B2 | 10/2005 | Prust | |
| 2004/0233910 A1 | 11/2004 | Chen et al. | |
| 2005/0268032 A1 | 12/2005 | Sikdar et al. | |
| 2007/0255768 A1* | 11/2007 | Shitomi et al. ............... | 707/204 |
| 2007/0283367 A1* | 12/2007 | Brabson et al. ............. | 719/330 |

* cited by examiner

*Primary Examiner*—Djenane M Bayard
(74) *Attorney, Agent, or Firm*—IP Authority, LLC; Ramraj Soundararajan

(57) ABSTRACT

A method is disclosed that places data-intensive subprocesses in close physical and logical proximity to the facility responsible for storing the data, so that high efficiencies at reduced cost are achieved. In one specific example, new computer programs, termed adjuncts, are added and placed in a logical partition on a storage facility so that they can be invoked using appropriate commands issued on the I/O channel. Further, programs or changes are added to existing programs on the host machine, wherein such programs or changes discover the function extensions and invoke them to perform data processing.

18 Claims, 11 Drawing Sheets

SYSTEM TO DELEGATE VIRTUAL STORAGE ACCESS METHOD RELATED FILE OPERATIONS TO A STORAGE SERVER USING AN IN-BAND RPC MECHANISM

BACKGROUND OF THE INVENTION

1. Field of Invention

The present invention relates generally to a system and method aiding in efficiently performing data-intensive operations. In particular, it relates to a system to delegate virtual storage access method related file operations to a storage server using an in-band RPC mechanism.

2. Discussion of Prior Art

Many business processes today are very data-intensive, and the efficiency of computer programs in processing many megabytes or gigabytes of data for these operations is a key factor in business effectiveness. The problem faced is how to adopt data-intensive operations in a manner that is viable in a commercial data-processing environment. An attractive option is to perform computations locally, where the data is stored (e.g. on a storage server). The benefits of performing computations where the data is stored result from applying system resources more efficiently. Application processing at the storage system magnifies the total throughput that can be achieved by the host application. Furthermore, by avoiding the transmission of large volumes of data through multiple hardware and software layers, processing can often be achieved in a shorter time at lower cost.

However, to have practical use, any solution based on the idea of performing computations close to storage must address a number of component problems enumerated below:

- enabling a wide range of application-specific processing where the data is stored;
- allowing dynamic activation of and binding to the available application-specific processing capabilities;
- preserving data access security;
- preserving the stability of the basic data storage functionality; and
- allowing maintenance and management of the application-specific functionality.

Prior work has addressed some component problems in the following manner:

- Add custom operations to the storage server that allow some data processing at the storage server. This has been done in the past. For example, the search functions in the Extended Count-Key-Data (ECKD) command set provided by control units can be regarded as an example of this approach. However, this puts the goal of maintaining and upgrading the added custom functions into conflict with the goal of preserving the stability of the storage server: Any added function or modified implementation constitutes a new code load for the storage server, which entails significant development and testing cost. Also, the scope of application-specific functions is highly constrained because the storage server environment does not present a general-purpose programming environment. For example, it might not support familiar threading and scheduling constructs, dynamic memory allocation, virtual memory, scripting languages, and installation of nonstandard drivers.
- Add a dedicated application server to the system, connected to the storage server by normal SAN connections, that performs the data-intensive computation. This approach has cost disadvantage because of added hardware. Especially when the data is owned by mainframe computers and stored in the CKD (Count-Key-Data) format, because small inexpensive servers that can access such data are not readily available. In addition, there are significant problems for ensuring data security while allowing access from the dedicated application server. Also, this approach cannot achieve the potential benefits of higher bandwidth and better response time that can result from incorporating the data processing operations into the storage server.
- Provide a "disklet container" on storage devices like hard disks. This offers an interesting approach complementary to this invention. It provides a facility on hard disks into which an ordinary user of storage can download executable code and cause it to be executed against the storage objects on that hard disk to which that user has access. To make this acceptable in a multi-user system, only code that can rigorously and automatically be proved to be well-behaved is accepted into the facility. One key weakness of this approach is that it does not offer a solution for hosts that access CKD data. Another, more intrinsic difficulty is that the requirement of provable good behavior significantly constrains the function that can be achieved.

The following references outline some of the above-mentioned prior art techniques and suffer from many of the drawbacks outlined above. These references fail to teach or suggest a solution that is targeted to solve the same problem that the present invention addresses.

The Domenikos et al. (U.S. Pat. No. 5,838,910) provides for systems and methods for executing application programs from a memory device linked to a server at an internet site. Domenikos et al. discloses a system and method for executing programs stored at a remote server. In the various embodiments described in this patent, the application programs are loaded into the client's memory. It should, however, be noted that Domenikos et al. do not address the problem of running adjuncts on a server that are used by controlling applications.

The U.S. patent to Blackwell, Jr. et al. (U.S. Pat. No. 5,857,191) teaches a Web application server with secure common gateway interface. Blackwell, Jr. et al. disclose an application server which processes web browser client requests conforming to the CGI (Common Gateway Interface) protocol. The server described in this patent has a fixed set of CGI (or CGI-like) scripts installed that can be used by the clients and does not provide adjuncts and an adjunct I/O facility. The CGI scripts run on the same platform as the web server and affect the function of the web server. In addition, the patent is focused on the field of web servers and clients.

The U.S. patent to Thomlinson et al. (U.S. Pat. No. 6,532,542 B1) provides for protected storage of core data secrets. Thomlinson et al. discloses a storage system that controls access to data stored on it based on client program attributes. The system is built primarily for controlling access to data objects stored on the server. It should, however, be noted that the Thomlinson et al. patent does not address the problem of running client-specific adjuncts on the storage facility.

The U.S. patent to Prust (U.S. Pat. No. 6,952,724 B2) provides a network-based remote data storage system having multiple access interfaces. Prust discloses a storage server which manages several storage pools for different clients and allows the clients to manipulate the data using various access methods like HTTP, email, WebDAV etc. It should be noted that Prust does not teach or suggest the use of adjuncts. Also, the applications running on the storage server run on the same platform as the storage engine and are not adjuncts that are executed with protection.

The U.S. patent publication to Chen et al. (2004/0233910 A1) provides for a storage area network using data communication protocol. Chen et al. disclose a system for communicating with storage servers and for allocating and using storage space on the storage servers. However, it should be noted that Chen et al.'s system does not teach or suggest the use of adjuncts.

The patent publication to Sikdar et al. (US 2005/0268032 A1) teaches a semantic processor storage server architecture, and in particular, teaches a method to decrease the complexity of storage servers (by reducing the number of integrated circuits) by utilizing semantic processors. Sikdar et al., however, fail to teach or suggest the use of adjuncts.

SUMMARY OF THE INVENTION

A method is disclosed that places data-intensive subprocesses in close physical and logical proximity to the facility responsible for storing the data, so that high efficiencies at reduced cost are achieved. In one example, new computer programs, termed adjuncts, are added and placed in a logical partition on a storage facility so that they can be invoked using appropriate commands issued on the I/O channel. Further, programs or changes are added to existing programs on the host machine, wherein such programs or changes bind to the adjuncts and invoke them to perform data processing.

In one embodiment, the present invention provides for a system comprising a storage facility, a host, and a host input/output channel. The storage facility further comprises a data store, an adjunct I/O facility, an RPC router, an adjunct, wherein the adjunct is invokable using commands issued to the storage facility, and an adjunct control. The adjunct I/O facility receives, from an adjunct, requests to perform an operation on a storage object that resides on the data store, and responds to those requests by performing the operation, after verifying that the adjunct has been granted access to that storage object. The host further comprises: using said host input/output channel to issue commands and data to said storage facility, a controlling application for discovering an adjunct, binding to said discovered adjunct, invoking said discovered adjunct, and generating access-control messages with required authority, and a data manager to provide data-access control information for use by said adjunct I/O facility. The commands issued via the host input/output channel are used to access data on said data store, and to communicate with the RPC router so as to invoke said adjunct.

In one specific embodiment, the host is a mainframe computer system.

In one specific embodiment, the host input/output channel supports count key data (CKD) data storage operations.

In one specific embodiment, the storage facility contains a server and said adjunct is contained in an adjunct container, said adjunct container being a logically partitioned address region of said server.

In one specific embodiment, the adjunct is an AIX application to perform regular expression scans and file difference evaluations.

In one specific embodiment, the adjunct control is implemented as part of the adjunct container.

DESCRIPTION OF THE PREFERRED EMBODIMENTS

The present invention provides a method that places data-intensive subprocesses in close physical and logical proximity to the facility responsible for storing the data, so that high efficiencies at reduced cost are achieved. In one specific embodiment, the present invention achieves these benefits for a mainframe type of computer installation, wherein the operational efficiency achieved by the present invention carries significant economic benefits.

For the generic problem of achieving high data-processing performance with good economy, the approach embodied in this invention is to run application-specific data-processing programs on the storage facility, i.e., the facility that manages the storage of data as a general service.

This invention applies to a broad class of data-intensive operations, including those for non-mainframe (or "open systems") computers. However, we focus on the benefits achieved for mainframe computers, for the particular case of the operations of scanning datasets with complex data organizations for recognizable patterns.

In one non-limiting example, the present invention is based on the architecture of the DS8000 storage server product line, wherein:

new computer programs, termed adjuncts, are added and placed in an LPAR on the DS8000 so that they can be invoked using appropriate commands issued on the host I/O channel.

programs or changes are added to existing programs on the host machine, wherein such programs or changes bind to the adjuncts and invoke them to perform data processing.

The specific processing offered in the first preferred embodiment is to extract a VSAM Linear Data Set from the CKD storage, render it as an open-systems file which holds the same data at corresponding byte offsets, and scan the file for regular-expression patterns.

In the preferred embodiment, the communications from the controlling application to the adjunct is "in band" in that it uses the same I/O channel used to connect the client server and the controlling application to the storage server for prior-art access to its data. This is advantageous in many situations because it obviates the need to provide and manage an additional communications path.

Figure 1:
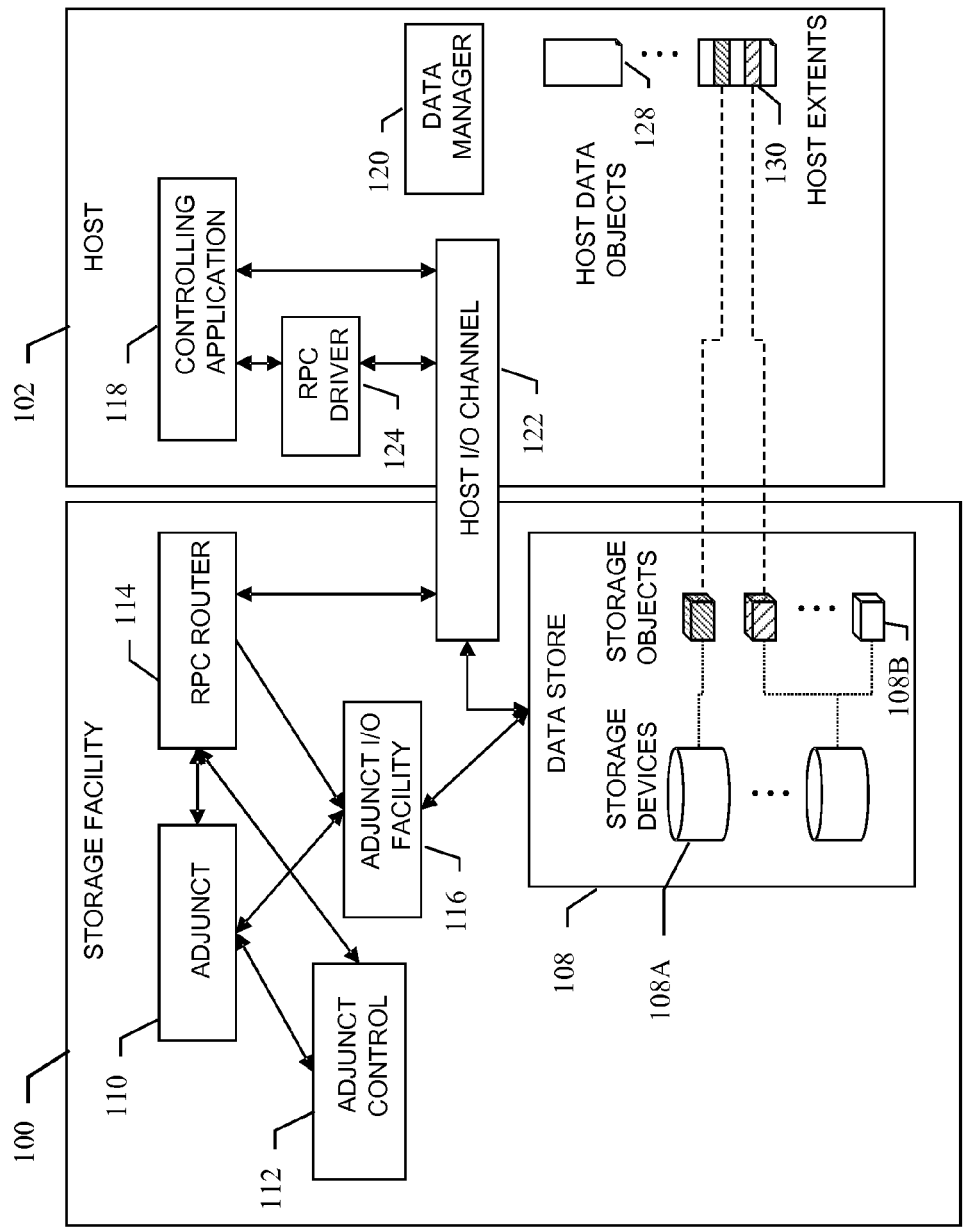
FIG. 1 illustrates an embodiment of the present invention's system comprising a storage facility and a host.

FIG. 1 illustrates an embodiment of the present invention's system. According to this embodiment, the system comprises a storage facility 100, a host 102, and a host I/O channel 122.

The storage facility 100 comprises an adjunct 110, an adjunct control 112, an RPC router 114, a adjunct I/O facility 116, and a data store 108 which comprises a plurality of storage devices 108A and storage objects 108B. As a non-limiting example, the storage facility could be a storage system product of existing art, further incorporating changes and additions to embody the invention.

The host 102 comprises a controlling application 118, a data manager 120, and an RPC driver 124. Associated with the controlling application are a plurality of host data objects 128 which comprise units of data denoted as host extents 130 which may be associated with storage objects 108B. As a non-limiting example, the host could be a server computer of existing art further comprising input/output hardware and an operating system, and having its constituent elements modified to provide for the embodiment of the invention.

A host input/output (I/O) channel 122 is connected to elements in the storage facility 100 and elements in the host 102, and provides for I/O operations between the host and storage facility. As a non-limiting example, it could consist of storage network adapters, driver software, Fibre Channel switches and cabling, and protocol-handling software in the storage facility.

A discussion of functionality associated with each of the system blocks in FIG. 1 is provided below:

Data store 108: A data store provides a means for components external to the data store to write data to or read data from or both write data to and read data from a plurality of storage objects 108B, the data store using a plurality of storage devices 108A to handle and contain the data read or written. There are many embodiments of a data store in the existing art and the invention does not provide for new features internal to the data store. Each storage object might be assigned to storage locations on one or more storage devices. The assignment and associated processing might provide for such capabilities as error correction, parity checking, replication, dynamic reassignment of a storage object to different locations or devices, read caching, and write-back caching. Storage devices may comprise devices such as disk drives, volatile or non-volatile memory devices, read-only memory, FLASH memory, tape drives, tapes, and devices for processing and transmitting data such as adapter cards and processors. Storage objects 108B are logical entities with identities known to the components external to the data store and treated as abstract containers for units of data such as bits and bytes. The data store may also comprise data structures for its own use which in some embodiments become accessible by components outside the data store.

In one non-limiting example of a data store, the storage objects are fixed-size blocks each capable of storing 512 bytes of data, the storage objects are identified by a logical block address and a logical unit number, and the means to write and read data comprises the commands of a SCSI block device. In another non-limiting example, the storage objects are tracks capable of storing CKD records, the storage objects are identified by a volume identifier, a cylinder number and a head number, and the means to write and read data comprises the command set defined for an IBM 3390 device. In another non-limiting example, the storage objects are files, the storage objects are identified by a pathname, and the means to write and read data comprises the commands of an NFS protocol. In another non-limiting example, the storage objects are logical tape images and the means to write and read data comprises the commands of a SCSI sequential device. In another non-limiting example, the storage objects are logical tape images and the means to write and read data comprises the channel commands of a mainframe tape device. In another non-limiting example, the storage objects are objects as described in the SCSI command set for object stores.

Adjunct 110: An adjunct is a computer program or programs which can be invoked using appropriate commands issued on a host I/O channel, wherein such computer programs read or write storage objects in a data store and perform processing of the data. The access by an adjunct to storage objects is controlled by the adjunct I/O facility 116 and is limited to those objects for which permissions are granted as provided for in this invention. The computer program or programs of the adjunct are run with protection in order to prevent them from accessing storage objects or data structures or other resources in the data store to which access has not been granted for it. There is at least one storage object in the data store for which access by the adjunct is contingent upon binding as described here. If an adjunct's access to an object is contingent upon binding then the adjunct is denied access to it when there is no binding with a controlling application having access to that storage object, but the adjunct is granted access to it during part or all of the time that a controlling application having access to that storage object has established a binding to the adjunct. As a non-limiting example, the major fraction of storage objects could have access contingent upon binding, said storage objects being associated with host data objects 128, and a said storage object associated with a host data object being made accessible to the adjunct only during the time that a controlling application with access to the host data object has a binding to the adjunct, and additionally only after an RPC invocation associated with said storage object has been issued and before the response to said RPC operation has been delivered. The adjunct may additionally have unconditional access to other of the storage objects in the data store which access is not dependent on the binding of controlling applications, for example storage objects for private data and scratch space of the adjunct. In some embodiments, there are data structures in the data store other than storage objects to which the adjunct is granted unconditional access.

Applications on the host bind to these adjuncts and invoke them for performing various data processing tasks. Binding comprises establishing a connection so that the application and adjunct can exchange messages, and may also comprise establishing a session in association with which information may be retained between messages. Non-limiting examples of the various tasks associated with the adjunct include, but are not limited to, the extraction of a virtual storage access method (VSAM) linear data set from a count key data (CKD) storage, the rendering of the extracted data as an open-systems file which holds the same data at corresponding byte offsets, and the scanning of the open-systems file for regular-expressions patterns.

The protected manner in which the adjunct is executed differs from the usual manner in the existing art by which new capabilities are added to a data store. It is common practice for such new capabilities to be implemented as trusted code that is not prevented from accessing storage objects or accessing data structures internal to the data store. It is common furthermore that code must be tested thoroughly together with the data store before it is treated thus as trusted, because otherwise the required properties for the data store of data integrity, security, and reliability may not be achieved. It is an object and a benefit of the invention that required operation of the data store can be assured without requiring that adjunct code is trusted as ensured through said testing.

Adjunct control 112: This is a facility for servicing the adjunct or adjuncts, and for managing the control data for adjunct operation. Servicing the adjunct encompasses the actions a technical administrator might normally do today to manage a software program installed on a server. Non-limiting examples of these actions include starting or stopping the execution of the adjunct, installing the software for the first time, replacing one version of the software with another, extracting measurements of utilization and performance from the software and from the container, setting parameters of the software and of the container that control the operation of the software, controlling the generation of diagnostics data from the software such as software core dumps, and extracting diagnostics data. Managing the control data for adjunct operation encompasses storing, updating and retrieving the information needed by the components in the system to behave correctly in setting up and terminating the use of adjuncts. Non-limiting examples of these actions include recording the presence and attributes of each adjunct, recording the presence and attributes of each controlling application, recording the binding of a controlling application to an adjunct, making the recorded information available in response to queries from the controlling application and other parties, and controlling updates of that information according to the availability of necessary resources and adherence to requirements stated in a policy.

RPC router 114: RPC router 114 is a facility for transmitting RPC invocations to the adjunct(s) and transmitting RPC results to the controlling application 118. It is also a facility for recording the binding of a controlling application to an adjunct so that RPC message delivery is controlled by that information. The RPC router may also be a locus for holding the operational data recorded under the control of the adjunct control 112. In the preferred embodiment, the RPC router uses the host I/O channel to transmit RPC invocations and results. In the preferred embodiment, the RPC router is responsible for communicating the control application's access control information received from the RPC driver 124 to the Adjunct I/O Facility 116. Non-limiting examples of methods of receiving access control information include receiving access control information embedded in RPC invocation messages and receiving access control information in stand-alone RPC invocation messages.

Adjunct I/O facility 116: The adjunct I/O facility 116 is a facility that receives, from an adjunct, requests to perform read operations on storage objects that reside on the data store, and responds to those requests by returning the client data, after verifying that the adjunct has been granted access to that storage object. The adjunct I/O facility 116 may also be a path that allows an adjunct I/O to perform write operations on storage objects, again contingent on the access permissions. In one non-limiting example, the storage object is in CKD format.

Controlling Application 118: Controlling application 118 is responsible for binding to an adjunct, invoking the discovered adjunct I/O, and generating access-control messages with required authority.

Data manager 120: The data manager 120 is a facility for handling the placement information that defines how host data objects 128 are divided into pieces called host extents 130 which are stored into storage objects 108B in data stores 108. It also provides access-control information for use by the adjunct I/O facility 116. In some embodiments, the data manager comprises the functionality associated with a computer file system, which includes updating the placement information and mediating the actions by which the controlling application reads and writes its host data objects, but that role is not inherent in embodying the invention.

Host input/output (I/O) channel 122: The host I/O channel 122 comprises software or hardware subcomponents, or both, said subcomponents contained in the storage facility or the host or external to both, which subcomponents enable the host to perform read and write operations on storage objects in the data store. These operations are provided for in the existing art. The host I/O channel further provides for the host to communicate with the RPC Router 114.

RPC driver 124: The RPC driver 124 is a facility for transmitting RPC invocations from the controlling application 118 to the RPC Router 114 and receiving RPC results from the RPC router and forwarding them to the controlling application. In the preferred embodiment, the RPC driver uses the I/O channel 122 to send and receive RPC invocations and results. In the preferred embodiment, the RPC driver collects the controlling application's access control information from the I/O channel and communicates the information to the RPC router.

Host data object 128: A host data object 128 is a logical collection of data upon which a controlling application 118 may perform processing. Non-limiting examples include files, directories, byte ranges in files, datasets, dataset pages, dataset logical records, database tablespaces, and database tables. A host data object is not necessarily materialized as a unified object physically on the host 102, but might exist as the logical interrelationship of the host extents 130 into which it is divided and the storage objects 108A to which they are mapped.

Host extent 130: A host extent 130 is a part of a host data object 128 that is stored on one data store 108, and which is mapped to one or more storage objects 108A. One non-limiting example is a consecutive range of bytes within a file that has been allocated onto a consecutive range of blocks in a SCSI disk device. In some cases, it is a matter of choice how to express a given host data object as a set of host extents. For example, the multi-block byte range of the previous example might be treated as one host extent at one time, and treated at a different time as a set of separate host extents each allocated to a single SCSI block, without making any difference to the placement in the data store of the data of the host data object.

Figure 2:
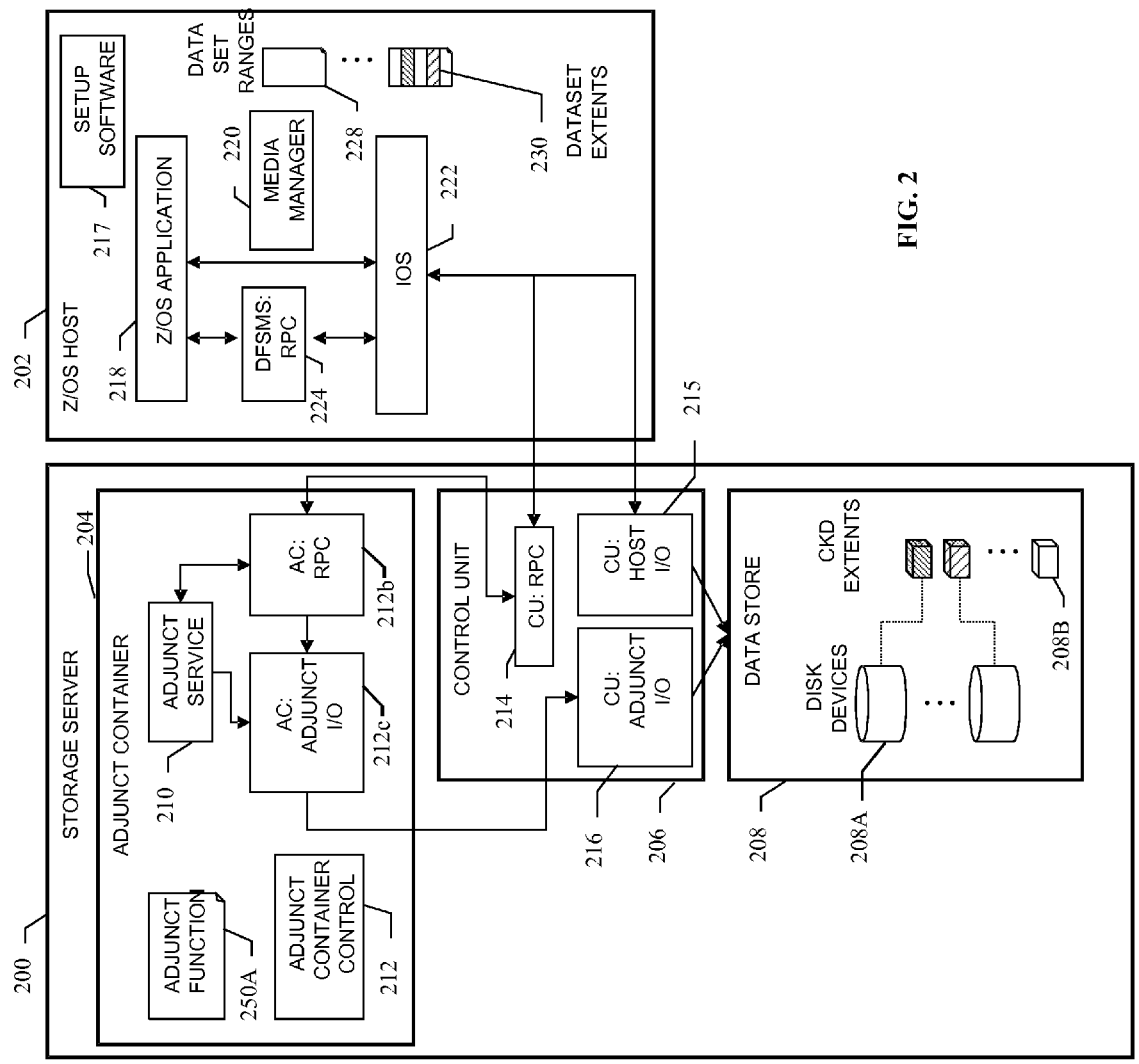
FIG. 2 illustrates a specific non-limiting example of the present invention's system comprising a storage server and a z/OS host.

In one non-limiting embodiment, the host is a mainframe computer system and the data store and the host I/O channel support CKD storage operations. In one non-limiting example, as shown in FIG. 2, the storage facility comprises an adjunct container and a control unit which are containers that provide for the structural separation of subcomponents having different roles. The control unit contains all of the subcomponents required for performing the host CKD operations of existing art. The structural separation provides for that if the adjunct container is absent or otherwise becomes unavailable then the control unit can be configured so that its connections to the adjunct container are deactivated and the host CKD operations of existing art can be performed safely and effectively. The structural separation also provides that the adjunct cannot access storage objects or data structures in the data store for which it has not been granted permissions. As a further non-limiting example, the adjunct container comprises one or more logically partitioned address regions (LPARs) contained in a DS8000 storage server sold as a product by IBM Corp., and the adjunct is an Advanced IBM Unix (AIX) application that performs regular-expression scans and file difference evaluations (e.g., grep and diff).

In this embodiment, the invention deploys the components to support prior-art I/O operations and components to support the adjuncts into separate LPARs of the same hardware platform. The adjuncts are contained in a general-purpose server image running a general-purpose OS (e.g., AIX). It includes privileged-mode services to perform the installation and activation of adjuncts. It also includes a service to communicate with the RPC Router capability that delivers function-invocation messages and receives function-result messages. That RPC router also connects in the control unit to I/O-channel code that invokes the RPC Router in response to new command chains received on an ESCON or FICON channel or to new SCSI commands received on an FCP channel.

The invention also includes a facility for making CKD format data and storage areas available for read and write operations by the adjuncts. This facility receives and uses access-control information supplied from a z/OS host in a way that ensures data access security is preserved. The invention also includes a facility for managing the installation and service of adjuncts. The invention also includes a facility on the application host (on which the controlling application runs) for constructing and delivering the command chains or SCSI commands that invoke adjuncts, and for generating access-control messages with required authority. It also includes modifications to the controlling application to test for the availability of adjuncts.

In FIG. 2, storage server 200 represents the storage facility, and z/OS host 202 represents the host. Storage server 200 comprises an adjunct container 204 and a control unit 206 which represent the structural separation of different subcomponent groups in the system, in order to achieve some of the benefits of the preferred embodiment as addressed further below. Storage server 200 further comprises a data store 208 which represents data store 108 and comprises disk devices 208A which represent storage devices 108A and which are storage locations for CKD extents 208B which represent storage objects 108B.

Some components in FIG. 1 correspond in FIG. 2 to multiple subcomponents. A step described below as being performed by or upon a component of FIG. 1 may be performed by or upon one of its subcomponents shown in FIG. 2 or by or upon multiple subcomponents together. The adjunct service 210 and adjunct function 250A in the adjunct container 204 represent different aspects of the adjunct 110. Subcomponents I/O subsystem (IOS) 222 in z/OS host 202 and CU: host I/O 215 in control unit 206 represent host I/O channel 122. Subcomponents CU: RPC 214 in control unit 206, and AC: RPC 212b in adjunct container 204 together represent RPC router 114. Subcomponents AC: Adjunct I/O 212c in the adjunct container 204 and CU: Adjunct I/O 216 in the control unit 206 together represent the adjunct I/O facility 116.

Adjunct container 204 is a capability in the storage server 200 for restricting the behavior of all subcomponents contained in said adjunct container, thus protecting the system resources outside the container and the operation of subcomponents outside the container. One non-limiting example of restricting behavior is ensuring that the total consumption of processor time by all contained subcomponents is less than a previously determined fraction of the total processor time available. Another example is ensuring that the total memory claimed by all contained subcomponents is less than a previously determined fraction of the total memory available. Another example is ensuring that a data structure owned by a subcomponent outside the container cannot be accessed by any contained subcomponent, except where such data structure is designated by said owning subcomponent as accessible by said contained subcomponent. Another example is ensuring that a device owned by a subcomponent outside the container cannot be accessed by any contained subcomponent. Another example is stopping the adjunct container thus requiring that all contained subcomponents be restarted from a known state before they can access any shared or pooled system resources. Another example is fencing the adjunct container so that for a time period controlled outside the adjunct container the contained subcomponents cannot access shared system resources.

The adjunct container 204 may be a partition of the computer system resources contained in the storage server 200, said resources comprising individually identifiable resources such as processors, data structures, files, I/O adapter slots, I/O adapters, and I/O resources, and also comprising non-identifiable resources such as shares of or entitlements to processor time, memory, disk space, and bandwidth. In a preferred embodiment, this partition consists of one or more logically partitioned address regions (LPARs) in the computer system or systems contained in the storage server 200, such as those of an IBM computer system. In alternate embodiments, said partitions may each consist of a separate computer system or multiple computer systems, or a processor blade or multiple processor blades, or other partitions of computer system resources. In other embodiments, said partition may consist of one or more virtual machines hosted within one or more computer systems.

The adjunct container 204 may consist of policies and enforcement mechanisms for restricting contained subcomponents that might not be readily identified as a partition of computer system resources. An example is a workload partition (WPAR) or WPARs within an AIX operating system image or images.

Adjunct container 204 comprises said adjunct service 210, said adjunct function 250A, said AC: RPC 212b, said AC: Adjunct I/O 212c, and an adjunct container control 212 representing the adjunct control 112. The adjunct function 250A comprises the installed data and executable programs for activating an adjunct service 210.

Control unit 206 comprises the subcomponents of storage server 200 not included in the adjunct container 204 or in the data store 208, which subcomponents are protected by the restrictions provided by the adjunct container. Control unit 206 specifically comprises said CU: host I/O 215, said CU: RPC 214 in control unit 206, and said Adjunct I/O 216.

Control unit 206 does not necessarily comprise capabilities for restricting the behavior of the subcomponents contained in it. In the preferred embodiment, the control unit consists of partitions of the computer system resources, said partitions providing restrictions that protect the operation of the subcomponents in the adjunct container.

z/OS host 202 further comprises a controlling application 218, media manager (MM) 220 representing the data manager 120, said IOS 222, DFSMS: RPC 224 representing RPC driver 124, and data set ranges 228 representing host data objects 128, which in turn comprise dataset extents 230 which represent host extents 130. As a non-limiting example, the z/OS host 202 might be embodied as a System z computer from IBM Corp. and a logically partitioned address region (LPAR) within it configured to run the z/OS operating system, the media manager 220 and I/O subsystem 222 being embodied as the similarly-named components of that system each modified to embody the features of this invention, and DFSMS: RPC 224 being embodied as a new capability added to the Data Facility: System Managed Storage (DFSMS) software of z/OS so as to embody the invention.

In a typical embodiment of the present invention, the adjunct has, in its operations upon storage objects associated with host data objects, only as much privilege as the controlling application. In z/OS, application data access is controlled by multiple layers of software including RACF (Resource Access Control Facility), which controls the ability of applications to open handles to datasets, and MM and IOS (I/O subsystem) which enforce access privileges of individual I/O requests. Since the adjunct runs without the control of z/OS components like RACF and MM, the present invention's design involves MM in the RPC protocol so that access privileges can be controlled.

Example Methodology of FIG. 2

The user of the invention achieves the goal of the invention by performing procedures described in sections below with reference to additional figures. The user first initializes the system, ensuring that there is a controlling application 118 and an adjunct 110, and that there is a host data object 128 that contains a host extent 130 whose data is stored in a storage object 108B in the data store 108, and also ensuring that a binding has been established between the controlling application and the adjunct, and that the additional components have been configured to allow RPC messaging between them and adjunct I/O operations. For the preferred embodiment described with reference to FIG. 2, this involves obtaining and installing, using procedures apparent to one of ordinary skill in the art, a z/OS host and a storage server embodying the invention and comprising the components and connections shown in FIG. 2, with the exception that the Adjunct service 210 is not necessarily present after this step. The creation of host data objects, host extents, and storage objects in the data store is done by the operation of ordinary I/O between the host 102 and host I/O channel 122 and the storage facility 100 familiar in existing art. The user then prepares an adjunct for use, which is a procedure to ensure that one more adjunct services 210 are present in the system which moreover are able to provide the services required by the z/OS application 218. Having done this preparation, the user then causes the z/OS application 218 to execute if it is not already doing so. The z/OS application 218 then uses the capabilities presented by the adjunct service 210, which include the ability to access storage objects associated with host data objects in turn associated with the z/OS application 218.

Figure 3:
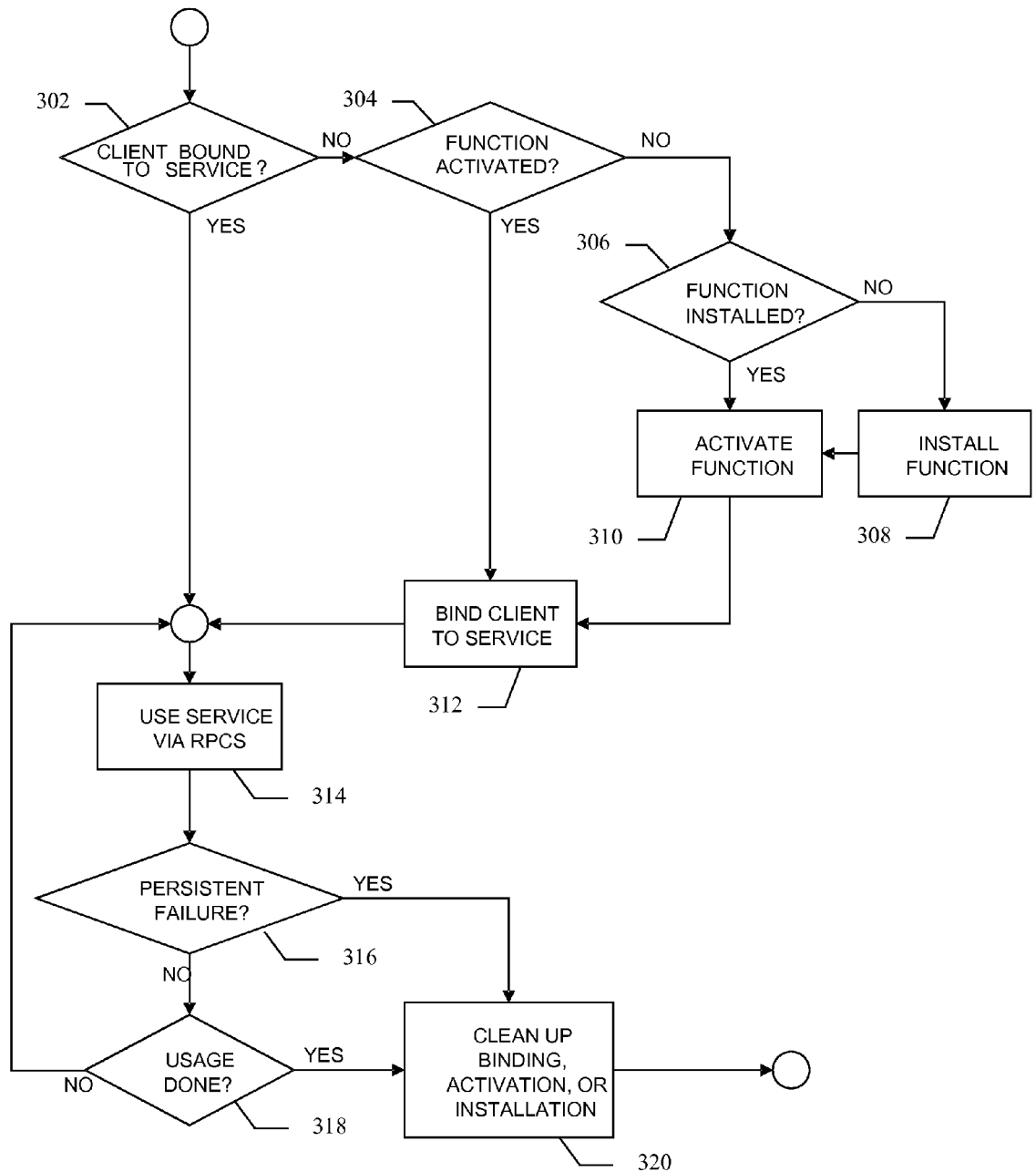
FIG. 3 illustrates a non-limiting example of the steps provided for in the present invention to prepare and use the adjunct.

The preferred embodiment for preparing and using the adjunct is described below in reference to FIG. 3, with some steps described in more detail with reference to additional figures. The Adjunct function 250A is installed, then an executing Adjunct service 210 is activated, then the z/OS application 218 is bound to the Adjunct service 210. In the preferred embodiment, these steps are initiated by setup software 217 which may be executed as part of the z/OS application 218 or as one or more steps initiated manually by the user. First, the setup software 217 determines (step 302) whether the control data contained in the DFSMS:RPC 224 indicate that there is already a binding of the z/OS application 218 (in the role labeled as client) to the Adjunct service 210 (in the role of service). If not then the setup software 217 determines (step 304) whether the control data contained in the DFSMS:RPC 224 and additional data retrieved from the CU: RPC block 214 indicate that the Adjunct function 250A has already been activated as a service available for binding. If not then the setup software 217 determines (step 306) whether the control data contained in the DFSMS:RPC 224 and additional data retrieved from the CU: RPC block 214 indicate that the Adjunct function 250A has already been installed as a function available for activation. It may be, for example, that the Adjunct function 250A has been preinstalled in the product, or that it has been installed in a prior execution of step 308. If not, then the setup software 217 performs (step 308) the procedure of installing the Adjunct function 250A as a function available for activation. The procedure of step 308 is described in detail with reference to FIG. 4.

After successfully completing step 308 or determining in step 306 that step 308 is unnecessary, the setup software 217 performs (step 310) the procedure of activating the function (which is Adjunct function 250A) as a service available for binding. The procedure of step 310 is described in detail with reference to FIG. 5. After successfully completing step 310 or determining in step 304 that step 310 is unnecessary, the setup software 217 performs (step 312) the procedure of binding which establishes the z/OS application 218 as a client of the service which is Adjunct service 210. The procedure of step 312 is described in detail with reference to FIG. 6.

After the setup software 217 successfully completes step 312 or determines in step 302 that step 312 is unnecessary, the controlling application performs (step 314) the procedure of using the service via RPCs. The procedure of step 314 is described in detail with reference to FIGS. 7, 8, 9, 10, and 11. Step 314 might be repeated many times, for example, because there are many separate desired operations to be performed, or because one desired operation is to be performed on many host data objects 128, or because a single desired operation on one large host data object 128 is performed as separate operations on host extents 130.

After each use, the z/OS application 218 evaluates (step 316) whether the results represent a persistent failure that prevents further use. If not, the z/OS application 218 evaluates (step 318) whether it has completed its use of the service. If not, the z/OS application 218 continues using the service via RPCs (step 314). If step 316 detects a persistent failure or step 318 detects completion of use, then a cleanup procedure (step 320) is performed. The details of step 320 are not of the essence to the invention, and will be different for different embodiments, although one of ordinary skill in the art will recognize that the step might comprise removing the binding of the client to the service, or deactivating the function, or removing the installation of the function.

Figure 4:
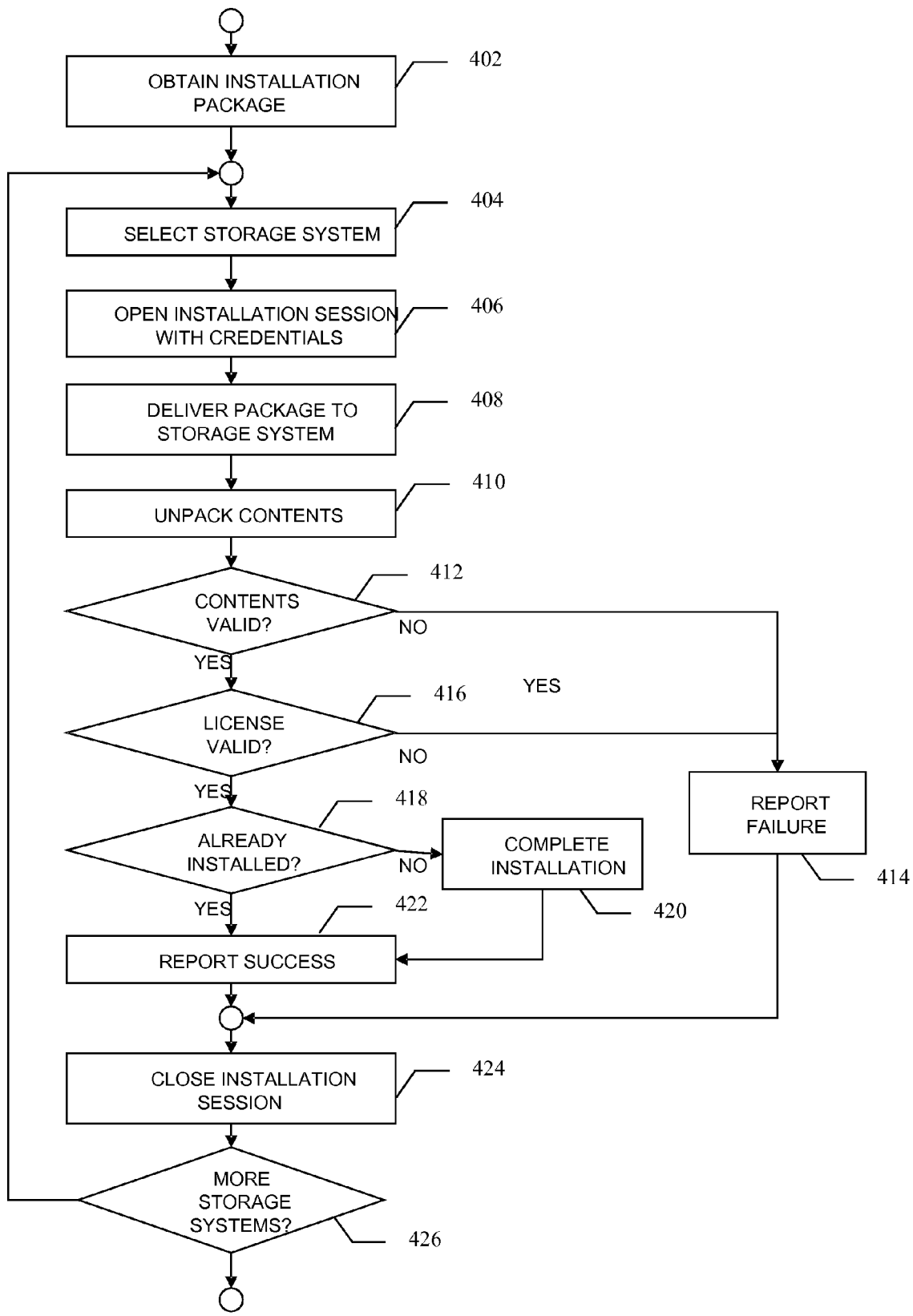
FIG. 4 illustrates a non-limiting example of the steps provided for in the present invention to install the adjunct as a function available for activation.

The procedure (step 308) of installing the Adjunct function 250A as a function available for activation is described in detail with reference to FIG. 4. The setup software 217 obtains (step 402) from a trusted provider the installation package, which consists of one or more files or data objects. In one embodiment, the installation package is included within the materials provided as the installation of the z/OS application 218, and step 402 consists of obtaining the location of the package from the z/OS application 218. In another embodiment, the installation package is obtained separately. Having obtained the installation package, the setup software 217 selects (step 404) which storage server 200 should receive an installation, and opens (step 406) an installation session on the adjunct container control 212 associated with that system. Step 406 might include exchange and verification of passwords or other credentials to ensure that the setup software 217 is operating with sufficient authority. The setup software 217 then delivers (step 408) the installation package to the adjunct container control 212. The adjunct container control 212 unpacks (step 410) the contents of the package and tests (step 412) whether the contents of the package are valid. The tests in step 412 may include verifying that required components are present and meet expectations of data self-consistency. The adjunct container control 212 also evaluates (step 416) whether the configuration information for the storage server 200 allows the function or functions contained in the package to be installed. If not, or if the validity test in step 412 fails, then the adjunct container control 212 reports failure (step 414) to the setup software 217 and the attempt to perform installation on this storage server 200 is abandoned.

If step 416 determines that the license is valid, then the adjunct container control 212 evaluates (step 418) whether the function or functions are already installed and, if not, completes (step 420) the installation. Step 420 includes the adjunct container control 212 copying and deploying files to the adjunct container 204. It may also include recording the fact of completed installation so that the knowledge of installations already performed may be available for future executions of the evaluation 306. After adjunct container control 212 completes step 420 or determines in step 418 that step 420 is unnecessary, it reports 422 the success to the setup software 217, which then closes 424 the installation session. The step 424 may include recording in the data of the DFSM-S:RPC 224 the successful or unsuccessful completion of installation.

The system may include a multiplicity of storage servers 200, so the setup software 217 determines (step 426) whether installation should be performed on additional storage servers 200 and, if so, performs the procedure again starting at step 404. The decision in step 426 might take into account the location of storage objects that have been or will be used by the z/OS application 218.

Figure 5:
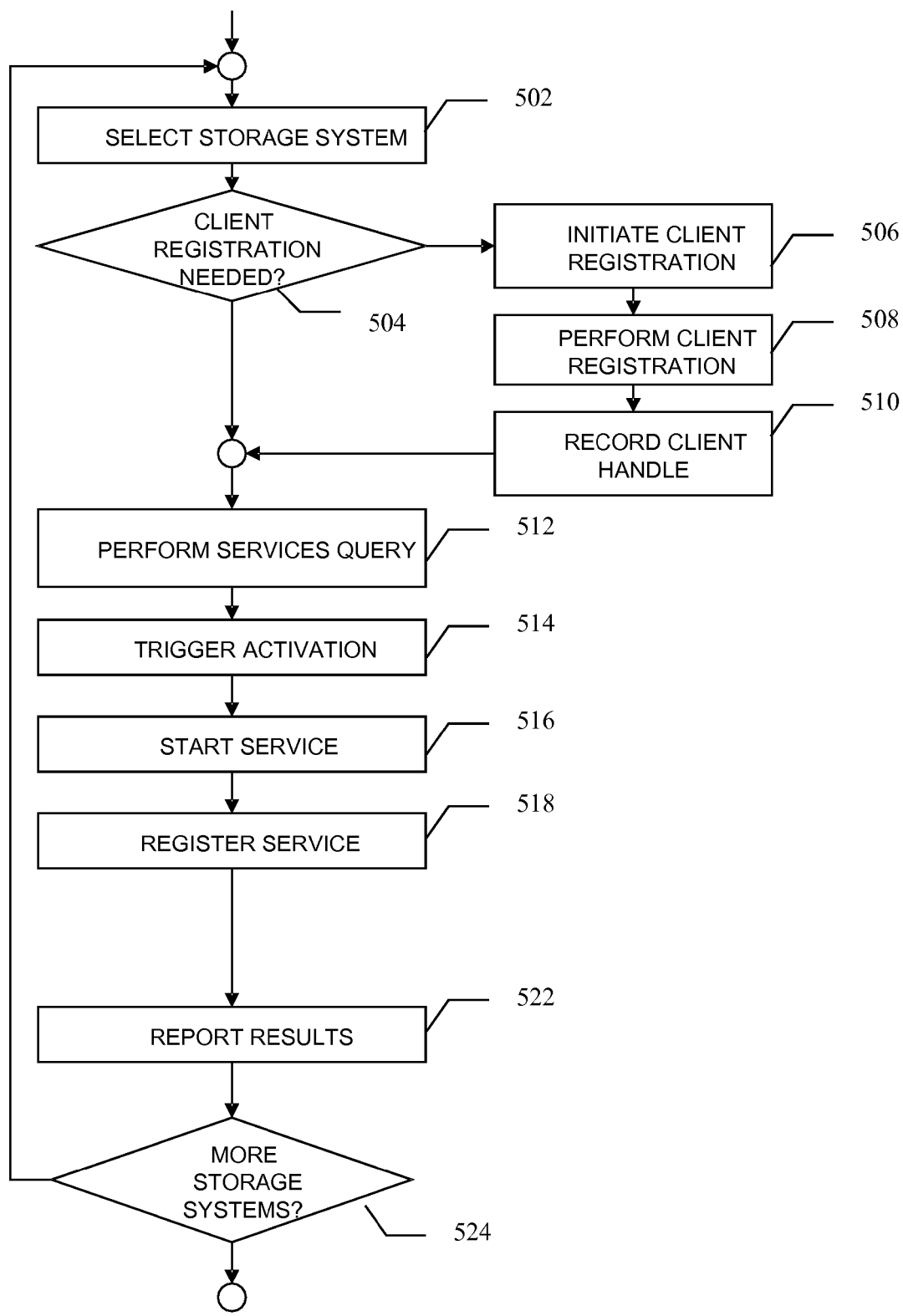
FIG. 5 illustrates a non-limiting example of the steps provided for in the present invention to activate the adjunct as a service available for binding.

The procedure (step 310) of activating the function (which is Adjunct function 250A) as a service available for binding is described in detail with reference to FIG. 5. The setup software 217 selects (step 502) which storage server 200 should perform an activation, and determines (step 504) whether it is necessary to register the z/OS application 218 as a client. Registration may be necessary in embodiments for which the Adjunct function 250A needs to be associated with a particular client when it is activated. Registration will not be necessary if the Adjunct function 250A does not need this association; or if the registration has already been performed and continues to be valid; or if the embodiment does not require a separate registration step to create the handle with which the client is identified.

If step 504 determines that registration is necessary, the setup software 217 initiates (step 506) a client registration process by sending a request that contains identifying attributes and descriptive attributes about the z/OS application 218 to the adjunct container control 212. The Adjunct container control 212 performs client registration (step 508) by determining availability of registration space and, if available, formulating the client handle and recording an association of the client handle with other identifying attributes, and possibly performing logic on the attributes to determine whether the z/OS application 218 should be admitted as a client. Upon receiving the results of registration, which include the client handle, the setup software 217 records (step 510) an association of the client handle with the z/OS application 218.

After completing the registration (step 510) or determining in step 504 that registration is not needed, the setup software 217 submits query request (step 512) to the Adjunct container control 212 to confirm that the required Adjunct function 250A is installed and ready for activation. When this succeeds, the setup software 217 submits an activation request (step 514) to the Adjunct container control 212. The Adjunct container control 212 activates (step 516) the Adjunct service 210. Step 516 identifies the process or processes in the adjunct container 204 that are to perform the operations of the activated service. In the preferred embodiment, this is done by starting new processes for this purpose that execute one or more executables associated with the Adjunct function 250A. In other embodiments, an existing process or processes could be identified for the service. In addition, step 516 includes configuring the Adjunct container control 212 so that messages associated with the activated service can be exchanged between the CU: RPC block 214 and the processes of the Adjunct service 210. Step 516 might additionally include recording access-control information that provides for the adjunct to access via the adjunct I/O facility 116 some storage objects 108A to which it is granted unconditional access, for example, for its scratch space, and step 516 might also include creating storage objects for the unconditional use by the adjunct.

The adjunct container control 212 then registers the Adjunct service 210 (step 518), by recording in the identifying and addressing attributes of the service. Then the Adjunct container control 212 reports the results (step 522) of activation to the setup software. The system may include a multiplicity of storage servers 200, so the setup software 217 determines whether activation should be performed (step 524) on additional storage servers 200 and, if so, performs the procedure again starting at step 502.

Figure 6:
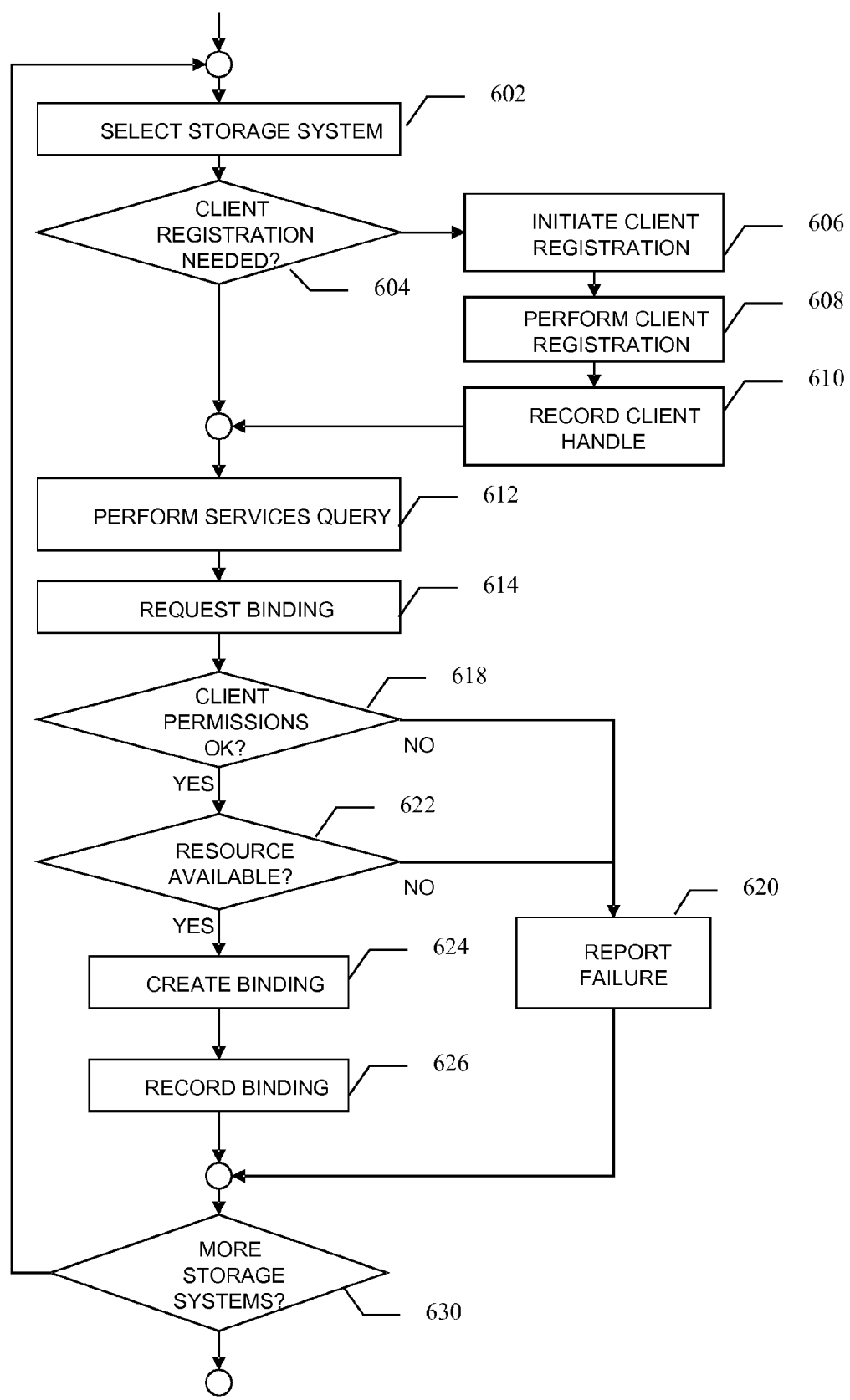
FIG. 6 illustrates a non-limiting example of the steps provided for in the present invention to bind the controlling application as a client to the adjunct as a service.

The procedure (step 312) of binding which establishes the z/OS application 218 as a client of Adjunct service 210 is described in detail with reference to FIG. 6. The setup software 217 selects (step 602) to which storage server 200 the binding should be performed, and determines (step 604) whether it is necessary to register the z/OS application 218 as a client. Registration will not be necessary, if the registration has already been performed and continues to be valid. It also will not be necessary, if the embodiment does not require a separate registration step to create the handle with which the client is identified. For example, the client handle may be constructed in a well-defined way from the identifying attributes of the z/OS application 218 and the identifying attributes of the z/OS host 202, and if actions equivalent to step 608 may be performed later in the process.

If step 604 determines that registration is necessary, the setup software 217 initiates (step 606) client registration as in step 506 described above. Then the Adjunct container control 212 performs client registration (step 608) as in step 508 described above. Then the setup software 217 records (step 610) the results as in step 510 described above.

After completing the registration (step 610) or determining in step 604 that registration is not needed, the setup software 217 submits (step 612) a query request to the Adjunct container control 212 to confirm that the required Adjunct service 210 service is activated and ready for binding. When this succeeds, the setup software 217 submits (step 614) a binding request to the Adjunct container control 212. The Adjunct container control 212 evaluates (step 618) whether the client should be admitted to bind to the service. Admission may be denied, for example, if the service was activated with an association to a particular client and the bind request is for a different client. In some embodiments, the descriptive attributes of the z/OS application 218 which were recorded during the registration step 608 are examined in evaluating (step 618) the admission criteria. For example, a specific Adjunct function 250A may have attributes specifying that only a z/OS application 218 produced by the same software vendor may be admitted to bind to it. If admission is denied at step 618, then Adjunct container control 212 generates and delivers (step 620) a report of the failure to the setup software 217. If the client is admitted in step 618, the Adjunct container control 212 evaluates (step 622) whether resources are available to create a new binding, and if not it generates and delivers (step 620) a failure report.

If test in step 622 passes, then Adjunct container control 212 creates (step 624) the binding of the z/OS application 218 as client to the Adjunct service 210 as service. Step 624 comprises setting up configuration data, in the CU: RPC block 214 or in AC; RPC 212b or both, that permits messages to be exchanged between the Adjunct service 210 and the DFSMS:RPC 224 on behalf of the z/OS application 218. Step 624 also may comprise informing the Adjunct service 210 that it has an active binding to the specified client handle. When the setup software 217 is notified that the binding is created, it records (step 626) the attributes of the binding in the data of the DFSMS:RPC 224, so that messages can be appropriately addressed and routed.

The system may include a multiplicity of storage servers 200, so the setup software 217 determines (step 630) whether binding should be performed with additional storage servers 200 and, if so, performs the procedure again starting at step 602.

In some embodiments, the z/OS application 218 and the Adjunct service 210 perform a procedure of login, authentication, and initialization, before the work is conducted for which the invention is intended. This is an example of the interactions that can be conducted in the steps represented in FIG. 3 as steps 314, 316, and 318, possibly repeated multiple times. One of ordinary skill in the art will see that a similar procedure between the setup software 217 and the Adjunct service 210 can be incorporated into the binding procedure described in FIG. 6.

The procedures discussed so far are sufficient to set up the z/OS application 218 with a binding to a Adjunct service 210, which enables the steps 314, 316 and 318 to be performed, repeatedly if necessary, so as to make productive use of the adjunct and achieve the goals of the invention. These procedures have been presented as a sequence of steps initiated by a single agent designated as the setup software. One of ordinary skill in the art will see that the setup procedure might be performed with the same steps in a different order, or with some steps added or omitted, or by multiple agents, or as a mixture of automatic and manual actions, in other embodiments of the claims of this invention. For example, the three steps of installation 308, activation 310, and binding 312 may be combined into two steps or a single step. As another example, in the procedure described here, the installations to multiple storage servers 200 are completed before the first activation step is performed, but another embodiment would overlap those steps or perform them in a different order.

Figure 7:
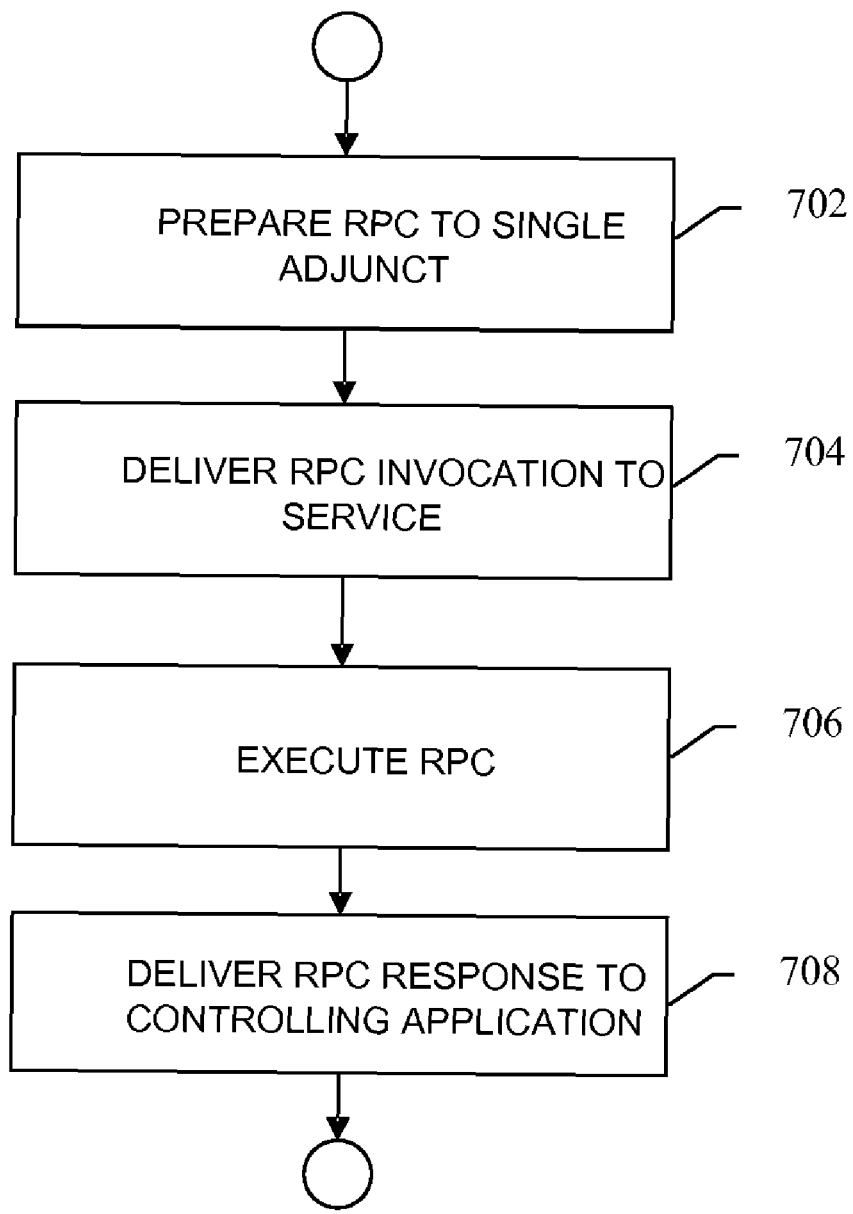
FIG. 7 illustrates a non-limiting example of the steps provided for in the present invention to use the adjunct as a service via RPCs.

The steps that follow are described for the example embodiment of FIG. 1 with additional detail regarding the preferred embodiments represented in FIG. 2. After a binding is established between a controlling application 118 and an adjunct 110, the controlling application performs (step 314) the procedure of using the service via RPCs. With reference to FIG. 7, the controlling application prepares 702 an RPC to a single adjunct. Step 702 comprises analyzing the data objects addressed in a desired operation to create an operation that can be performed by a single adjunct 110 on a single storage facility 100, and it is described in detail with reference to FIG. 8. The system components then deliver (step 704) the RPC invocation to the service. Step 704 is described in detail with reference to FIG. 9. The adjunct then executes (step 706) the RPC. Step 706 is described in detail with reference to FIG. 10. The system components then deliver (step 708) the RPC response to the controlling application. Step 708 is described in detail with reference to FIG. 11.

Step 702 of preparing an RPC to a single service is described in detail with reference to FIG. 8. In step 800, the controlling application 118 identifies a desired operation to be performed by the Adjunct 110 and a list of host data objects 128 that should be available to the service in performing the desired operation. A non-limiting example of such an operation is to find and record the positions of all instances of a given data pattern within the data of a VSAM dataset. The logic for identifying a desired operation may without limitation be included in the controlling application at the time the application is developed, using knowledge about the adjuncts that could be installed on the storage facility. The list of host data objects might, in some instances, be empty if the desired operation can be performed without accessing data objects. Step 800 might, in some instances, include the controlling application taking actions to ensure that the host data objects have been fully written to the storage objects, performing what is sometimes referred to in the art as a flush of dirty data to disk.

In step 802, the controlling application or the data manager 120, or both in cooperation, determine the mapping of the host data objects 128 to storage objects 108B. The mapping describes where the constituent parts of the host data objects are stored. The mapping may be embodied as a list of mapping table entries 820 each comprising a host data object ID 822 identifying the host data object, a range 824 identifying a range of contiguous addresses within the host data object, a storage facility ID 826 identifying a storage facility 100, and a storage object ID identifying a storage object 108B within the data store 108 of the storage facility 100. The host data object ID 822 and range 824 describe a host extent 130 and the remaining data in the mapping table entry 820 describes its association with a single storage object 108B. For each individual storage object, there is at least one adjunct I/O facility 116 through which it can be accessed in its entirety. Furthermore, for all the storage objects corresponding to a single host extent 130, there is at least one adjunct I/O facility 116 which they can be accessed in their entirety. This is a defining attribute of what constitutes a host extent 130 in this invention. It might also be possible for the storage objects all to be accessed via multiple adjunct I/O facilities 116. However, it may not be possible for the storage objects for different host extents 130 to be accessed via a single adjunct I/O facility 116. For example, the multiple storage objects might be distributed over multiple storage facilities 100. This is commonly done as a striped allocation of a dataset to achieve high performance.

In the preferred embodiments, the objects correspond directly to the usage of CKD storage to contain the data of VSAM linear data sets, in a system containing z/OS and DFSMS. In this non-limiting example, a host data object 128 is a dataset range 228, i.e., a range of consecutively-numbered pages (which are named control intervals in VSAM terminology) within a VSAM linear data set. A storage object 108B is a CKD extent 208B, which consists of consecutively numbered CKD tracks on one volume within one DS8000 storage server 200. The information defining the CKD extent specifies the storage system, the volume, and the CKD track addresses (expressed using cylinder and head numbers). A host extent 130 is a dataset extent 230, which is a dataset range 228 with the additional property that the pages are contained within a single CKD extent 208B. The prior-art facilities for VSAM include the recording of a map that relates dataset extents to CKD extents. In this embodiment of the invention, step 802 creates a list of dataset extents and one CKD extent for each dataset extent.

In steps 804 and 806, the controlling application 118 or data manager 120 evaluates whether the set of all storage objects represented in the mapping is co-resident; i.e., whether the storage objects can all be accessed in their entirety via a single adjunct I/O facility 116. If there are no storage objects (because the data object is empty), or if there is only one storage object, then the set is co-resident. If all objects in the set are in the same CKD volume, then the set is co-resident. Otherwise, evaluation of whether the is co-resident depends on the embodiment. In the preferred embodiments, for example, one adjunct I/O facility 116 is restricted to access data within one storage server 200, so if any two objects are on separate storage servers 200 then the set is not co-resident. In the first preferred embodiment, storage objects that are not on the same CKD volume are regarded as not co-resident even when the two volumes are on the same storage server.

If step 806 determines that the set is co-resident, then the controlling application 118 constructs 808 a set of data access descriptors, which are message fragments that express the contents of the mapping produced in step 802 in a form that can be used within adjunct I/O facility 116 to define access permissions for the adjunct. The data access descriptors specify the storage objects and any restrictions of access to them, for example, including a restriction to read operations only. A data access descriptor is constructed so as to describe only storage objects and operations for which the controlling application has authority to grant permissions. In the preferred embodiments, the scope of said granting authority is equal to those objects and operations which the controlling application has permission to perform. The construction and subsequent storage of the data access descriptors are done as protected system operations in the host 102. That is, applications that have not been granted the authorization to perform privileged operations are prevented from reading or modifying the content of the data access descriptors. An unauthorized modification to the data access descriptors could, if permitted, enable such a non-privileged application to use the adjunct 110 as a means to read or modify storage objects in a way that is incompatible with the policies of the host 102. In the preferred embodiments, the z/OS application 218 has authorization to perform privileged operations, and is permitted to access the data access descriptors as ordinary data structures. In an alternative embodiment, the controlling application 118 does not have such authorization, and additional measures are provided to enable the controlling application 118 to cause the creation of data access descriptors and to reference and manage them while protecting the integrity of their content.

For some embodiments, the mapping produced in step 802 already contains the data access descriptors, so step 808 performs no new work. For other embodiments, step 808 involves making a copy in which local identifiers of volumes are replaced with the volume identifiers used within the storage facility 100.

If step 806 determines that the set is not co-resident, then the controlling application 118 evaluates (step 810) whether it is useful to perform the desired operation on a co-resident subset of the host data object or host data objects. In some cases, the desired operation is partitionable, in the sense that its results can be obtained by performing an equivalent operation separately on each co-resident subset and then perform a simple post-processing step to combine and correct the results. In other cases, an operation is non-partitionable; i.e., it can be performed only with the entirety of the host data object. An example of the first case is an embodiment where the desired operation is to perform a regular-expression pattern-match search on the data and count the matches, with the additional knowledge a priori that no valid match can straddle more than one host extent 130. In such a case, a separate RPC could be issued to perform the search on each host extent 130, and the separate results could be assembled in order, possibly with relabeling to account for the different locations in the input. A possible example of the non-partitionable case might be a graph-analysis algorithm in which each storage object describes a subset of graph nodes or a subset of edges. It may also occur that an operation is partitionable in principle but it is not considered useful to perform it in a partitioned form.

If the outcome of step 810 is that performing an operation on a subset is not useful then this effort to prepare an RPC is abandoned (step 812). If the outcome is that it is useful, then the controlling application 118 reformulates 814 the operation into an operation on a co-resident subset. The reformulated operation is processed starting at step 802, and yields a completion via step 808 because the set is co-resident. In the preferred embodiments, the portion of the mapping produced in step 802 that describes the co-resident subset is re-used so that the second execution of step 802 need not repeat the same work. In the preferred embodiments, the portion of the mapping that describes other co-resident subsets is also retained and used to prepare additional RPCs that could be issued and performed concurrently.

Figure 8:
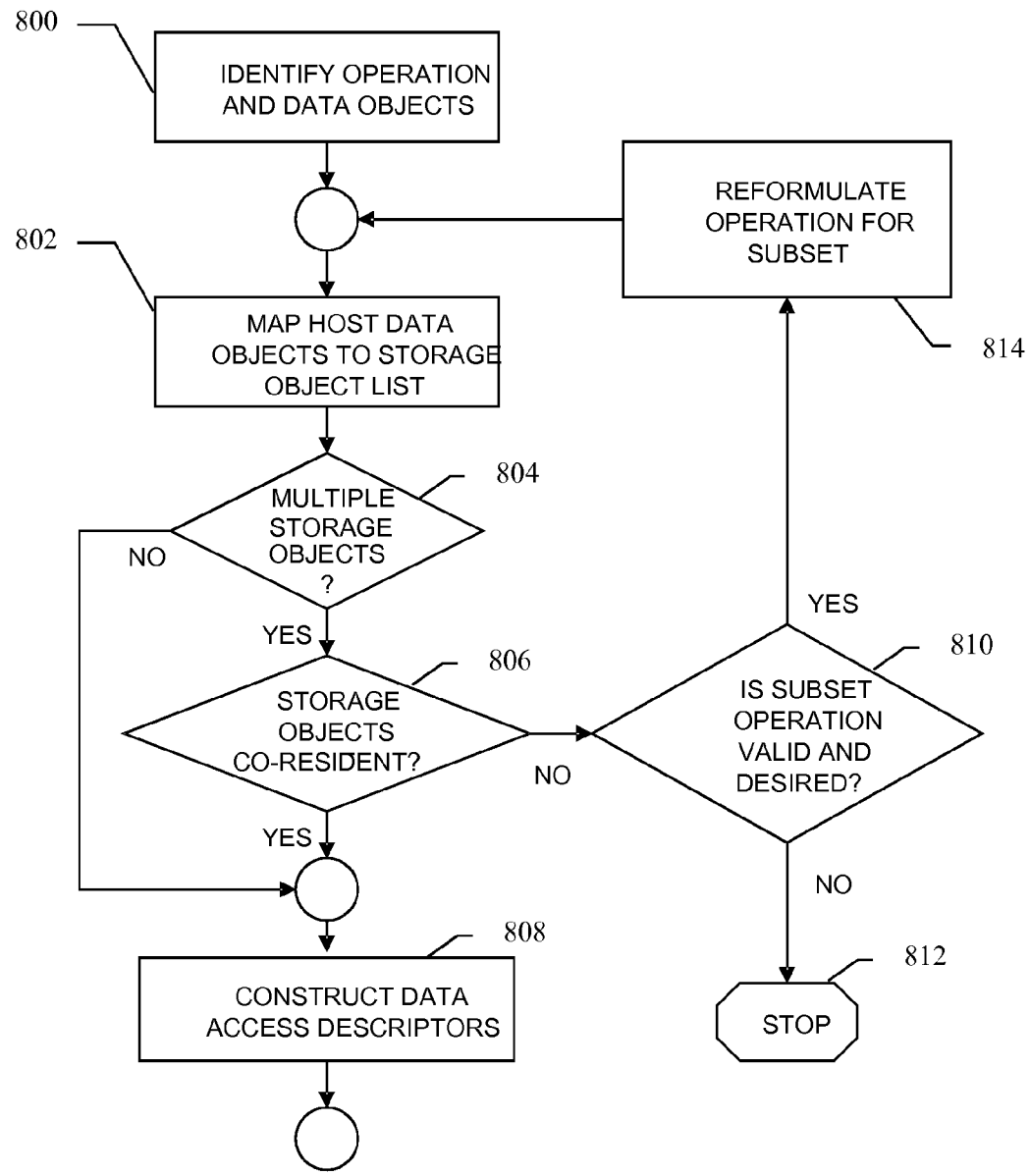
FIG. 8 illustrates a non-limiting example of the steps provided for in the present invention to prepare an RPC to a single adjunct.
Figure 8:
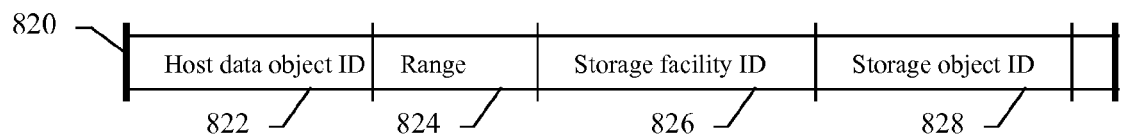
Figure 9:
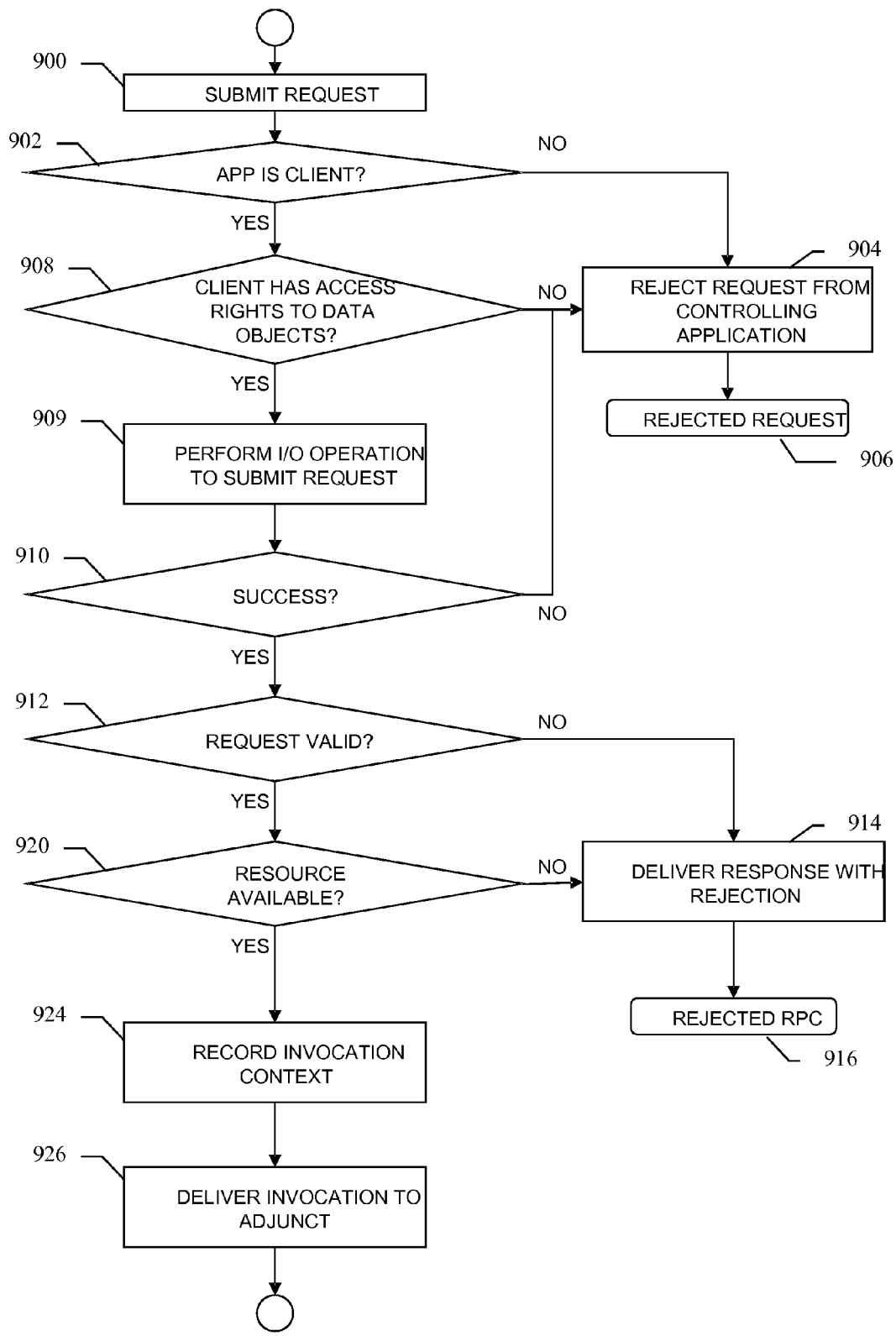
FIG. 9 illustrates a non-limiting example of the steps provided for in the present invention to deliver an RPC invocation to the adjunct.

In the preferred embodiments, the underlying data placement information from which the actions of steps 802, 804, 806, 808, 810, and 814 are derived is not subject to change during the execution of the procedure depicted in FIG. 8. This is an attribute of VSAM data sets in z/OS. In alternate embodiments, the underlying data placement information may be subject to change, and therefore the contents of a host data object might be moved from one set of storage objects to another, except when operations are performed to lock it. In such embodiments, the procedure of step 314 must additionally incorporate logic not specifically provided for in this invention to perform the locking and unlocking of data placement information.

After the controlling application 118 prepares (in step 702) an RPC to a single service as described above, the system components perform the procedure of step 704 of delivering the RPC invocation to the adjunct. The objects of step 704 are presenting to the adjunct 110 sufficient information for it to determine that the request is an authentic request from a valid client, to perform the desired operation, and to return a response to the client, protecting the system against unauthorized operations, and setting data in system components so that permitted actions by the adjunct succeed. In the example embodiment described here with reference to FIG. 9, many of the steps to prevent unauthorized actions are taken during the procedure of step 704.

The controlling application 118 submits 900 a request to the RPC driver 124. This is done using the provisions by which an application executing within a computer operating systems make use of trusted services offered by that operating system. The RPC driver 124 verifies (step 902) that the controlling application 118 has permission to act as a client and that any identifiers included in the request are consistent with the identity of the application submitting the request. This is done to ensure that one controlling application 118 cannot make unauthorized use of a binding created on behalf of a different controlling application 118. If the check step 902 fails then the request is rejected 904. If the check step 902 succeeds, then the RPC driver 124 verifies (step 908) that the controlling application 118 has permission to access the data objects referenced in the request. Step 908 may involve interacting with the data manager 120 to verify permissions. If the access check 908 fails, then the request is rejected 904. After a rejection at step 904, the sequence proceeds at step 906 via 1122 to step 1116 in the procedure described below with reference to FIG. 11.

If the access check 908 succeeds, then the RPC driver 124 causes host I/O channel 122 to perform 910 an I/O operation to submit the request to the RPC router 114. The object of step 910 is to convey to the RPC router 114 a request packet which is a package of information defining the request to be performed and the storage objects to be addressed by it and also comprising credentials that establish the authority of the sender to submit the request and the authority of the sender to grant access to the storage objects referenced in it. In the preferred embodiments, the I/O operation is one System z channel program that is executed by IOS 222 in communication via FICON with the control unit 206 contained in the storage server 200. The I/O operation transmits, as one logically contiguous set of bytes, a message assembled by the DFSMS:RPC 224 to contain all required information specifying the RPC request. The message includes the client handle which has been associated with the z/OS application 218 in the role as client. It also includes identifying information for the z/OS host 202. It also includes identifying information for the binding of the z/OS application to the Adjunct service 210. It also includes the data access descriptors constructed in step 808. It also includes information supplied by the z/OS application specifying the desired operation. Also, in the preferred embodiment, the channel program is directed to a CKD volume, and IOS 222 checks the authorization of the z/OS application and of the z/OS host to perform I/O operations to that volume, and prevents the completion of step 910 if the authorization is not confirmed.

In some embodiments, step 910 also includes actions by the RPC router 114 to validate the request packet being received. In the preferred embodiments, the CU: RPC 214 checks the authorization of IOS 222 to perform I/O operations to that volume. It also checks that the delivered message meets syntax requirements. It also checks that the volume identifier contained in the request packet matches the volume on which the I/O operation was performed. If any of these checks fail, then the I/O operation of step 910 is terminated with a failure.

One embodiment for the delivery of messages of step 910 is described later in Section II—Specification of the in-band RPC protocol. It will be apparent to one of ordinary skill in the art that the object of step 910 can be achieved in alternative embodiments that transmit the same or equivalent information using different formats, multiple I/O operations, or different I/O protocols.

After step 910 has completed, the RPC router 114 checks (step 912) that the contents of the request packet are valid in view of the control data available to the RPC router. This includes testing that the client handle in the request packet is valid as an identifier for a currently active client and that the attributes of that client are consistent with the other identification data included in the request packet, such as for example, the identification of the host 102. It also includes testing that the client thus identified has a current binding to the adjunct identified in the request packet. In the preferred embodiments, it also includes testing that the data access descriptors in the request packet do not reference any CKD volume other than the volume on which the I/O operation of step 910 was performed. The RPC router 114 then checks 920 that the system has resource available to admit a new RPC request to the adjunct. If either of the checks 912 or 920 fail, then the RPC router 114 formulates and delivers (step 914) a response message that reports the reason for rejection. This proceeds at step 916 via 1120 to step 1112 in the procedure described below with reference to FIG. 11.

If all of the checks 912, 918, 920 succeed, then the RPC router 114 or the adjunct control 112 or both record 924 request context data from the request packet for use during subsequent steps. In particular, the addressing information and the data access descriptors are retained. In preferred embodiments, the tests described above ensure that the access provided to the adjunct via the data access descriptors is limited to storage objects to which the controlling application itself has access to perform the same operations. In some embodiments, the recorded information goes beyond the original request packet to include additional information about the authorization of the operation, the addressing of the adjunct, the attributes of data objects referenced in the data access descriptors, or the allocation of resource to this RPC request.

The RPC router 114 then delivers (step 926) to the adjunct 110 an invocation packet derived from the request packet. The invocation packet includes information supplied by the controlling application 118 specifying the desired operation. It also includes data access information that enables the adjunct 110 to access in later steps the data objects described in the data access descriptors constructed in step 808. In some embodiments, the invocation packet also includes identifying information about the client or about the binding of the controlling application 118 to the Adjunct 110. One of ordinary skill in the art will recognize that there are many mechanisms in existing art that may be used in the embodiment of the delivery action of step 926, including but not limited to function calls, system calls, ioctls, named pipes, sockets, shared memory, and physical networking.

In the preferred embodiments represented in FIG. 2, the actions of the RPC router 114 are divided between its subcomponents, namely the CU: RPC 214 and AC: RPC 212b. The CU: RPC 214 performs those tests and actions which reference control data maintained within the control unit 206 to support the operations of CU: host I/O 215 according to prior art. The AC: RPC 212b performs those tests and actions which reference control data subject to change by the actions of the adjunct container control 212 during the steps described in reference to FIGS. 4, 5, and 6.

Figure 10:
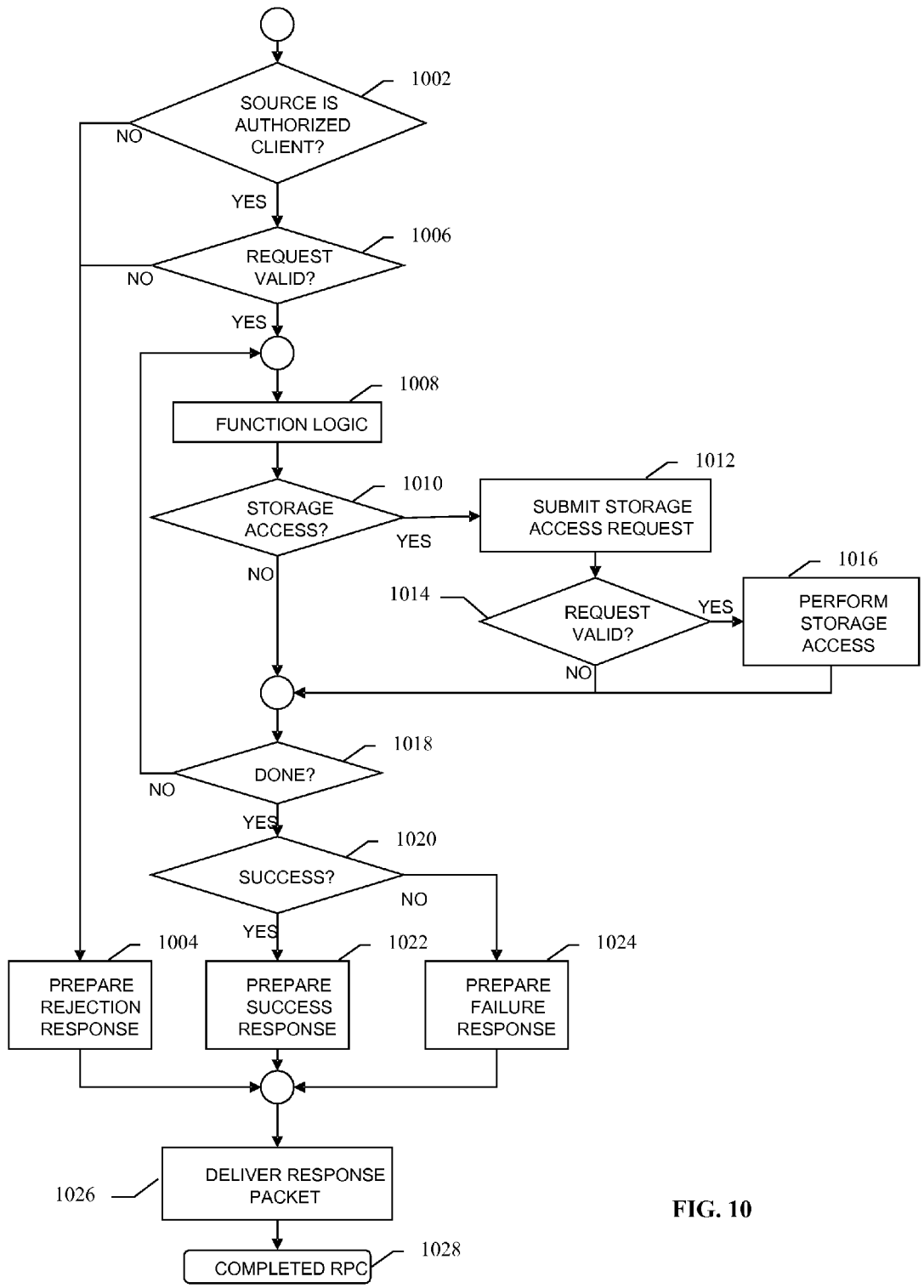
FIG. 10 illustrates a non-limiting example of the steps provided for in the present invention to execute an RPC.
Figure 11:
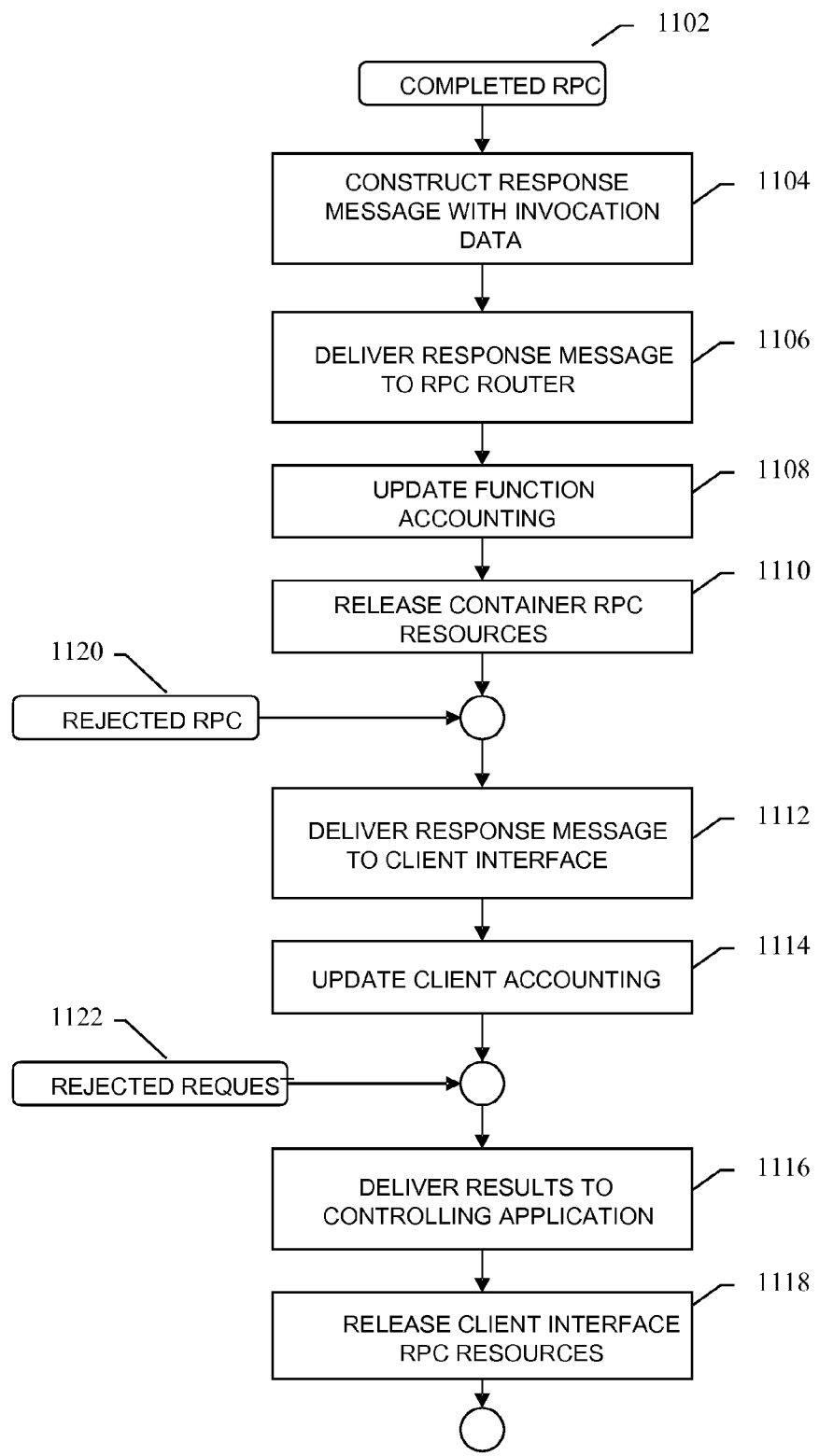
FIG. 11 illustrates a non-limiting example of the steps provided for in the present invention to deliver an RPC response to the controlling application.

After the delivery in step 926, the procedure of step 704 is complete, and the adjunct 110 and connected system components then perform the procedure of step 706, which is described here in reference to FIG. 10.

The adjunct 110 determines (step 1002) whether the invocation packet represents a request from an authorized client. In some embodiments, the determination of step 1002 references the information about the client provided by the RPC router 114 in step 926. In some embodiments, the determination of step 1002 tests the information supplied by the controlling application 118 for consistency with data retained by the adjunct 110 from previously executed RPCs, for example, those relating to login and authentication. If step 1002 determines the client is not authorized, the adjunct 110 prepares (step 1004) a response packet describing the rejection and proceeds to deliver (step 1026) that packet as described below. If step 1002 determines the client is authorized, the adjunct 110 determines (step 1006) whether the invocation packet contains a valid request. Step 1006 may include testing that syntax requirements are met, and that the requested operation is one the adjunct 110 is currently able to perform. If the invocation packet does not contain a valid request, then the adjunct 110 prepares (step 1004) and delivers (step 1026) a response packet describing the rejection.

If the invocation packet does not contain a valid request, then the adjunct 110 begins to perform (step 1008) the function logic called for in the request. It evaluates (step 1010) whether the operation calls for storage access and, if so, prepares and submits (step 1012) a storage access request to the adjunct I/O facility 116. The storage access request includes information that enables the adjunct I/O facility to associate it with one or more of the data access descriptors retained in step 924. The storage access request also describes the storage operation to be performed, which might include reading or writing a specified address range within a data object. A non-limiting embodiment of the request and its mechanism of submission is the use of standard I/O and file-access protocols in the current art.

When the adjunct I/O facility 116 receives the storage access request, it determines (step 1014) whether the request is valid. In the preferred embodiment, step 1014 includes testing that the process submitting the request is an activated service (and not, for example, an unauthorized program); testing that the storage request is performed with reference to a currently valid data access descriptor; testing that the data access descriptor is associated with an invocation currently active at the service; and testing that the parameters of the storage request are consistent with the attributes of the data access descriptor. If the storage access request is not valid, it is not performed; and a return code or other response is delivered to the adjunct 110 reporting the failure.

If the storage access request is valid, the adjunct I/O facility 116 interacts with the data store 108 to perform (step 1016) the storage access request. The adjunct I/O facility requests that the data store conduct operations on storage objects. It ensures that these operations on storage objects are limited to the objects and operations to which the adjunct 110 has been granted access. The set of storage objects to which the adjunct 110 has been granted access includes those referenced in the data access descriptors retained at step 924 and not yet discarded. In some embodiments, the adjunct 110 is granted access to additional storage objects. In the preferred embodiment, it is not. If it is detected that the storage access request involves operations or storage objects outside those permitted to the adjunct 110, then the storage access request is terminated with an error.

In some embodiments, the storage access request from the adjunct 110 is expressed using data objects that are not storage objects, and the adjunct I/O facility 116 transforms the data-object operations into storage-object operations. For example, in the preferred embodiment, the storage access request is expressed in terms of VSAM dataset ranges, and the adjunct I/O facility uses the information in the data access descriptor to split requests at boundaries between CKD extents 208B and to perform an address translation into CKD addresses (volume, cylinder, head, and record). In other embodiments, the storage access request is expressed using storage objects and a transformation is not necessarily performed.

When step 1016 completes, the results are communicated to the adjunct 110 so that it can proceed to step 1018. The status may be success or failure, and in the case of a failure it is possible that all, some, or none of the requested data transfers have occurred. These cases are familiar to those with ordinary skill in the art and the adjunct 110 is designed to respond appropriately to the possible outcomes. In some embodiments, the occurrence of certain failures causes the adjunct I/O facility 116 to terminate the processing of the RPC without giving the adjunct the opportunity to resume its function logic (step 1008); in such an embodiment, there would be an additional path to transition to step 1004. In the preferred embodiment, this is not done.

In step 1018, the adjunct 110 determines whether further processing or storage access is needed in performing the desired operation, and if so, it resumes the function logic (step 1008). The representation of processing in FIG. 10 is indicative of a single-threaded sequential programming model. This is a non-limiting embodiment of the invention. It will be apparent to one of ordinary skill in the art that many alternative embodiments of the claims of this invention are possible making use of such mechanisms as multiple threads and asynchronous I/O.

If the processing is complete, then the adjunct 110 evaluates (step 1020) whether the desired operation succeeded or not, and accordingly prepares a response packet reporting either success (step 1022) or failure (step 1024). The response packet normally contains additional data that represent the results of processing. The adjunct 110 delivers (step 1026) the response packet to the RPC router 114, at which point the procedure of step 706 and FIG. 10 is completed.

After the Adjunct service 210 delivers (step 1026) the response packet, the RPC router 114 initiates the procedure of step 708 to deliver the RPC response to the controlling application 118. This is described here with reference to FIG. 11.

The RPC router 114 constructs (step 1104) a response message containing the information contained in the response packet and additional information derived from the request context data retained at step 924. In particular, it contains addressing information specifying the client that should receive the response message. The RPC router 114 then updates (step 1108) the accounting information it retains about the adjunct that was invoked, and releases (step 1110) any resources it has allocated for the processing of this RPC request. Step 1110 includes discarding the request context data retained at step 924 including specifically the data access descriptors. Discarding the data access descriptors provides that they can no longer be used to grant access to storage objects 108B associated with the RPC.

At this point, or after internally generating a rejection response message in step 914, the RPC router 114 possesses a response message that needs to be delivered. It delivers (step 1112) the response to the RPC driver 124. In the preferred embodiments, step 1112 is done as I/O operations executed by IOS 222 in communication via FICON with the control unit 206. The control unit notifies IOS 222 of an attention condition, which prompts IOS 222 and the DFSMS: RPC 224 to perform additional I/O operations that retrieve the response message.

The RPC driver 124 updates 1114 any accounting data it is retaining about the controlling application 118 as client and about the binding between that client and the adjunct. In some embodiments, step 1114 includes detecting from the response message content whether a change has occurred in the state of the binding, or of the service activation, or of the installation, and recording that in the data retained by the RPC driver. This data may in turn be used in step 316 (FIG. 3) of determining whether a persistent failure has occurred.

After step 1114, or after internally determining in step 904 that a request is to be rejected, the RPC driver 124 delivers (step 1116) the results to the controlling application 118. It also releases (step 1118) any resources it has allocated for the completion of the RPC. This completes the procedure of delivering the RPC response to the controlling application.

The components and steps described above achieve the primary goal of the invention. There are other embodiments of the invention that achieve the primary goal, and there may be other systems that are not embodiments that achieve part of the primary goal. However, there are additional operations and events that arise in the ordinary course of running a computer system for which the preferred embodiments offer advantages as compared to systems that do not embody the invention. These operations include the control of access permissions and mappings of host data objects, the control of access permissions for storage objects, the recovery from a faulty adjunct, and the recovery from faults in certain components of the storage facility 200.

The preferred embodiments offer the advantage that they involve little disruption in the components and processes of existing art for control of access permissions and mappings of host data objects 128. Components in hosts of existing art such as file systems and the DFSMS Media Manager currently manage the mapping of host data objects to storage objects and the access permissions that control which host data objects can be accessed by a controlling application. These components support update operations to create new host data objects and establish their mappings, to modify access permissions, and to delete host data objects. In achieving the primary goal of this invention it is an important additional goal that any accesses to storage objects by an adjunct be done in a way consistent with the mapping and permissions attributes of the host data objects. In the preferred embodiments, the access by an adjunct 110 to storage objects 108B associated with host data objects is restricted (at step 1014) using data access descriptors derived at step 808 from data controlled by the data manager 120, and the data manager 120 is an extension of a said component in existing art that manages host data objects. Thus the effects of said update operations are reflected correctly in subsequently issued RPC invocations. In the preferred embodiments, additionally, processing of a said update operation includes the data manager 120 notifying the RPC driver 124 that mappings and permissions are being changed, the RPC driver notifying the RPC router 114 and thereby the adjunct I/O facility 116 that certain data access descriptors are no longer valid, the RPC router and the adjunct I/O facility responding that current and future storage access requests referencing said invalid data access descriptors are blocked, and the data manager allowing said update operations to complete after the response has been received. By these mechanisms, the many applications and procedures that lead to said update operations do not need to be changed to deal with the use of adjuncts.

The preferred embodiments offer the advantage that they involve little disruption in the components and processes of existing art for control of access permissions for storage objects 108B. It is common practice using existing art to provide for a plurality of hosts each using a data store 108 to store host data objects 128, and configuring control data associated in the host I/O channel 122 to ensure that each host is able to access only the storage objects available to it. This access control is vital in, for example, ensuring the security of bank account records. It is an important goal to ensure adjunct I/O operations are restricted to those permitted within access control, and another goal to avoid changing the procedures users must go through to manage access control information. In the preferred embodiments, the delivery of RPC invocations at step 909 is performed subject to the access restrictions already applied to the host I/O channel in existing art, and this restriction is carried forward into the testing of adjunct I/O operations at step 1014. There is no need for users to perform additional steps for setting storage authorization as applied to adjunct operations.

The preferred embodiments offer the advantage that minimal disruption is caused if there are faults in an adjunct 210, or in the system components comprised by the adjunct container 204, namely adjunct container control 212, AC: RPC 212b, or CA: adjunct I/O 212c. In the preferred embodiments, the components in the adjunct container 204 reside in a partition or partitions of the computing resources of the storage server 200, separate from the partition or partitions in which the components in the control unit 208 and the data store 208 reside. The separate partitions have separate operating system images and are isolated by low-level facilities. Even if the said components in the adjunct container include programs with faulty instructions and those faulty instructions are executed, the faulty instructions cannot modify the data in the memory of the control unit or of the data store, except for memory designated by CU: RPC 214 to receive messages from AC: RPC, memory designated by CU: adjunct I/O 216 to receive requests or status from AC: adjunct I/O about adjunct I/O operations, or memory designated by CU: adjunct I/O to receive data to be written to a storage object 208B to which access is authorized. The processing by the control unit of data in these designated memory areas includes protective logic ensuring that CU: host I/O 215 continues to operate correctly and that only those storage objects which were subject to change by correct execution of the adjunct service 210 are exposed to change by the faulty components.

Of course the idealized embodiment would not include faulty components, because when a component is faulty the steps required of it may be performed incorrectly or not at all, and the goal of the invention may not be achieved. However, the preferred embodiments provide the advantage that when faulty behavior is detected the partition or partitions containing the adjunct container 204 and all components in it can be stopped and restarted using methods known in the existing art while not interrupting the use of CU: host I/O and the data store by the z/OS host. It will be recognized by those with ordinary skill in the art that such a reboot action can restore the system to a state of successfully achieving the goal of the invention, even if the components still have the potential later to become faulty again.

Additionally, the present invention provides for an article of manufacture comprising computer readable program code contained within implementing a system for delegating virtual storage access method related file operations to a storage server using an in-band RPC mechanism. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are: (a) a first module to work in conjunction with a storage facility comprising: computer readable program code managing a storage object that is accessible by a controlling application; computer readable program code implementing an adjunct, wherein the adjunct runs with protection and is invokable by the controlling application; and computer readable program code enabling the adjunct to perform operations on the storage object, after verifying that the adjunct has been granted access to the storage object; and (b) a second module to work in conjunction with a host comprising: computer readable program code implementing the controlling application, the controlling application accessing the storage object and the controlling application also invoking the adjunct; and computer readable program code providing access control data about the storage object; and (c) a third module to work in conjunction with a host input/output channel through which the controlling application accesses the storage object.

SECTION II. Specification of the in-band RPC protocol for an ESCON or FICON I/O channel at the channel-program level.

A non-limiting example of an initial specification for I/O operations supporting RPC delivery is supplied below.

The following table lists the new ECKD commands available to the host. They are invoked as distinct suborders of the newly-defined "RPC" order in Define Subsystem Operation (DSO) ECKD commands. Whenever a DSO is expected to result on the control unit in sending any data back to the host (the "Output" column in the table), the channel program will then issue a subsequent Read Subsystem Data (RSSD) command for the maximum expected data size. A return code of 0 always indicates success, and integers are unsigned unless indicated.

| DSO suborder | Description | Input | Output |
| --- | --- | --- | --- |
| RPC_START_AND_WAIT | Submits an RPC invocation from the payload data delivered in the arguments. Returns when RPC has finished (and results are available) or failed. | VASLhandle vasl, int argSize, void *args | int retCode, RPChandle newRpc, RPCstatus retStatus, int resSize, void *results |
| RPC_START | Submits an RPC invocation from the payload data delivered in the arguments. Returns immediately (after the RPC service has taken delivery of the new RPC, or failed.) | VASLhandle vasl, int argSize, void *args | int retCode, RPChandle newRpc, RPCstatus retStatus where retCode is as in RPC_START_AND_WAIT |
| RPC_START_NOTIFY | Submits an RPC invocation from the payload data delivered in the arguments. Returns immediately (after the RPC service has taken delivery of the new RPC, or failed.) When this RPC completes later, the control unit will issue an ATTENTION to the channel. | VASLhandle vasl, int argSize, void *args | int retCode, RPChandle newRpc, RPCstatus retStatus where retCode is as in RPC_START_AND_WAIT Handle value newRpc will be received again in the ATTENTION message generated at RPC completion. |
| RPC_QUERY | Retrieves the summary status of a given RPC. (Could also return other bookkeeping data in future versions.) Returns immediately. | RPChandle rpc | RPCstatus retStatus |
| RPC_LIST | Retrieves a list of handles and execution status for all outstanding RPCs initiated by that host. Returns immediately (when the RPC service has built (made available) the list). | | int listSize, RPClist rpcs |
| RPC_GET_RESULTS | Retrieves the results data for the identified RPC. For successful completion this consists mainly of the data returned from the VASL. For failed RPC, returns error report containing identifying header and error code(s). Returns when the RPC in question has finished (and results are available), or failed. | RPChandle rpc | RPCstatus retStatus, int resSize, void *results |
| RPC_POLL_RESULTS | Returns immediately the available results for the identified RPC. For successful completion this consists mainly of the data returned from the VASL. For failed RPC, returns error report with identifying header and error code(s). For uncompleted RPC, returns zero-sized results. | RPChandle rpc | RPCstatus retStatus, int resize, void *results |
| RPC_ABORT | Signals that an RPC should be aborted. Returns immediately. | RPChandle rpc | int retCode = 1. Invalid handle 2. Communication failure to VASL |

CONCLUSION

A system and method have been shown in the above embodiments for the effective implementation of a method for delegating z/OS VSAM file operations to a storage server using an in-band RPC mechanism. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by the specific location of the facility for servicing the adjunct, the specific location of the RPC router, or the specific location of the adjunct I/O facility.

We claim:

1. A system comprising:
    a. a storage facility, comprising:
        i. a data store, which contains and/or manages a storage object accessed by a controlling application;
        ii. an adjunct, said adjunct running with protection and invokable by said controlling application, wherein said adjunct is an AIX application to perform regular expression scans and file difference evaluations; and
        iii. an adjunct I/O facility that enables said adjunct to perform operations on said storage object of the data store, after said adjunct I/O facility has verified that said adjunct has been granted access to said storage object; and
    b. a host comprising:
        i. said controlling application accessing said storage object; said controlling application also invoking said adjunct, wherein a binding of said controlling application to said adjunct is created during operation, and in which said adjunct I/O facility prevents access by said adjunct to said storage object if said binding has not been created; and
        ii. a data manager, said data manager providing access control data about said storage object to said adjunct I/O facility;
        iii. an RPC driver, said RPC driver delivering invocations to an RPC router and delivering results to said controlling application, said RPC router delivering invocations to said adjunct and delivering results to said RPC driver; and
    c. a host input/output channel through which said controlling application accesses said storage object.

2. The system of claim 1, wherein said host is a mainframe computer system.

3. The system of claim 1, wherein said storage object is associated with CKD format.

4. The system of claim 1, wherein one or more new adjuncts are added while the system is operating.

5. The system of claim 4, wherein programs on said host are used for the addition of said one or more new adjuncts.

6. The system of claim 1, wherein said RPC driver and said RPC router communicate via said host input/output channel.

7. The system of claim 6, wherein said RPC router delivers said access control data to said adjunct I/O facility.

8. The system of claim 1, wherein said adjunct is contained in an adjunct container.

9. The system of claim 8, wherein said adjunct container is any of the following: WPAR or a partition of computer system resources.

10. The system of claim 9, wherein said partition comprises any of the following: one or more LPARs, one or more computer systems or one or more virtual machines.

11. The system of claim 8, wherein access to said storage object by any subcomponent contained in the adjunct container is denied if said binding between said controlling adjunct and said adjunct has not been created.

12. The system of claim 8, wherein the adjunct container further comprises an adjunct container adjunct I/O facility, said adjunct container adjunct I/O facility being part of said adjunct I/O facility, and said adjunct container adjunct I/O facility being allowed access to said storage object whether or not a binding exists between said controlling adjunct and said adjunct.

13. A system comprising:
    a. a storage facility, comprising:
        i. a data store, which contains and/or manages a storage object in CKD format and accessed by a z/OS application;
        ii. an adjunct, said adjunct running with protection and invokable by a z/OS application;
        iii. an adjunct I/O facility that enables an adjunct to perform operations on said storage object of the data store, after said adjunct I/O facility has verified that said adjunct has been granted access to the object;
        iv. an RPC router, said RPC router delivering invocations to said adjunct and delivering results to an RPC driver via a host I/O channel; and
    b. a z/OS host comprising:
        i. a z/OS application, said z/OS application accessing said storage object, a binding being created between said z/OS application and said adjunct, said z/OS application also invoking said adjunct; and
        ii. a data manager, said data manager providing access control data about storage objects to said adjunct I/O facility; and
        iii. an RPC driver, said RPC driver delivering invocations to an RPC router via a host input/output channel and delivering results to said z/OS application; and
    c. a host input/output channel through which said controlling application accesses said storage object.

14. The system of claim 13, wherein said adjunct is an AIX application to perform regular expression scans and file difference evaluations.

15. The system of claim 13, wherein said adjunct is contained in an adjunct container, which contains also an adjunct container adjunct I/O facility, said adjunct container adjunct I/O facility being part of said adjunct I/O facility.

16. The system of claim 15, wherein said adjunct container adjunct I/O facility is allowed access to said storage object whether or not a binding exists between said controlling adjunct and said adjunct.

17. The system of claim 15, wherein said adjunct container comprises any of the following: one or more LPARs, one or more computer systems, or one or more virtual machines.

18. An article of manufacture comprising a computer storage medium having computer readable program code embodied therein to implement one or more modules executable with a computer-based system, said storage medium comprising:
    a. a first module to work in conjunction with a storage facility comprising:
        i. computer readable program code managing a storage object that is accessible by a controlling application;
        ii. computer readable program code implementing an adjunct, said adjunct running with protection and invokable by said controlling application, wherein said adjunct is an AIX application to perform regular expression scans and file difference evaluations; and iii. computer readable program code enabling said adjunct to perform operations on said storage object, after verifying that said adjunct has been granted access to said storage object; and
b. a second module to work in conjunction with a host comprising:
  i. computer readable program code implementing said controlling application, said controlling application accessing said storage object and said controlling application also invoking said adjunct, wherein a binding of said controlling application to said adjunct is created during operation, and in which said adjunct I/O facility prevents access by said adjunct to said storage object if said binding has not been created; and
  ii. computer readable program code providing access control data about said storage object;
  iii. an RPC driver, said RPC driver delivering invocations to an RPC router and delivering results to said controlling application, said RPC router delivering invocations to said adjunct and delivering results to said RPC driver; and
c. a third module to work in conjunction with a host input/output channel through which said controlling application accesses said storage object.

* * * * *